United States Patent [19]
Tamura et al.

[11] Patent Number: 5,587,352
[45] Date of Patent: Dec. 24, 1996

[54] THERMAL TRANSFER IMAGE-RECEIVING SHEET AND PROCESS FOR PRODUCING THE SAME

[75] Inventors: Yoshihiko Tamura; Mitsura Tsuchiya, both of Tokyo, Japan

[73] Assignee: Dai Nippon Printing Co., Ltd., Japan

[21] Appl. No.: 419,468

[22] Filed: Apr. 10, 1995

Related U.S. Application Data

[62] Division of Ser. No. 159,118, Nov. 30, 1993, Pat. No. 5,430,002.

[30] Foreign Application Priority Data

Nov. 30, 1992 [JP] Japan .................................. 4-341074
Nov. 30, 1992 [JP] Japan .................................. 4-341075
Dec. 28, 1992 [JP] Japan .................................. 4-358504

[51] Int. Cl.$^6$ ............................ B41M 5/035; B41M 5/38
[52] U.S. Cl. ........................ 503/227; 427/146; 428/195; 428/447; 428/913; 428/914
[58] Field of Search ................................ 8/471; 428/195, 428/447, 913, 914; 503/227; 427/146

[56] References Cited

FOREIGN PATENT DOCUMENTS

| 0336394 | 10/1989 | European Pat. Off. ................ 503/227 |
| 62-116189 | 5/1987 | Japan ..................................... 503/227 |
| 64-30793 | 2/1989 | Japan ..................................... 503/227 |
| 2-67193 | 3/1990 | Japan ..................................... 503/227 |
| 4-299186 | 10/1992 | Japan ..................................... 503/227 |

*Primary Examiner*—B. Hamilton Hess
*Attorney, Agent, or Firm*—Parkhurst, Wendel & Burr, L.L.P.

[57] ABSTRACT

A thermal transfer image-receiving sheet having a dye-receiving layer, which is excellent in reaction rate of a release agent, coating strength of a release layer and releasability from a thermal transfer sheet. The thermal transfer image-receiving sheet comprises a substrate sheet and a dye-receiving layer provided on at least one surface of the substrate sheet, wherein the dye-receiving layer contains a release agent mixture comprising an addition-polymerizable silicone and a hydrogen-modified silicone or wherein the dye-receiving layer has on its surface a release layer comprising an addition-polymerizable silicone and a hydrogen-modified silicone. The present invention relates also to a process for producing the above thermal transfer image-receiving sheets.

7 Claims, 1 Drawing Sheet

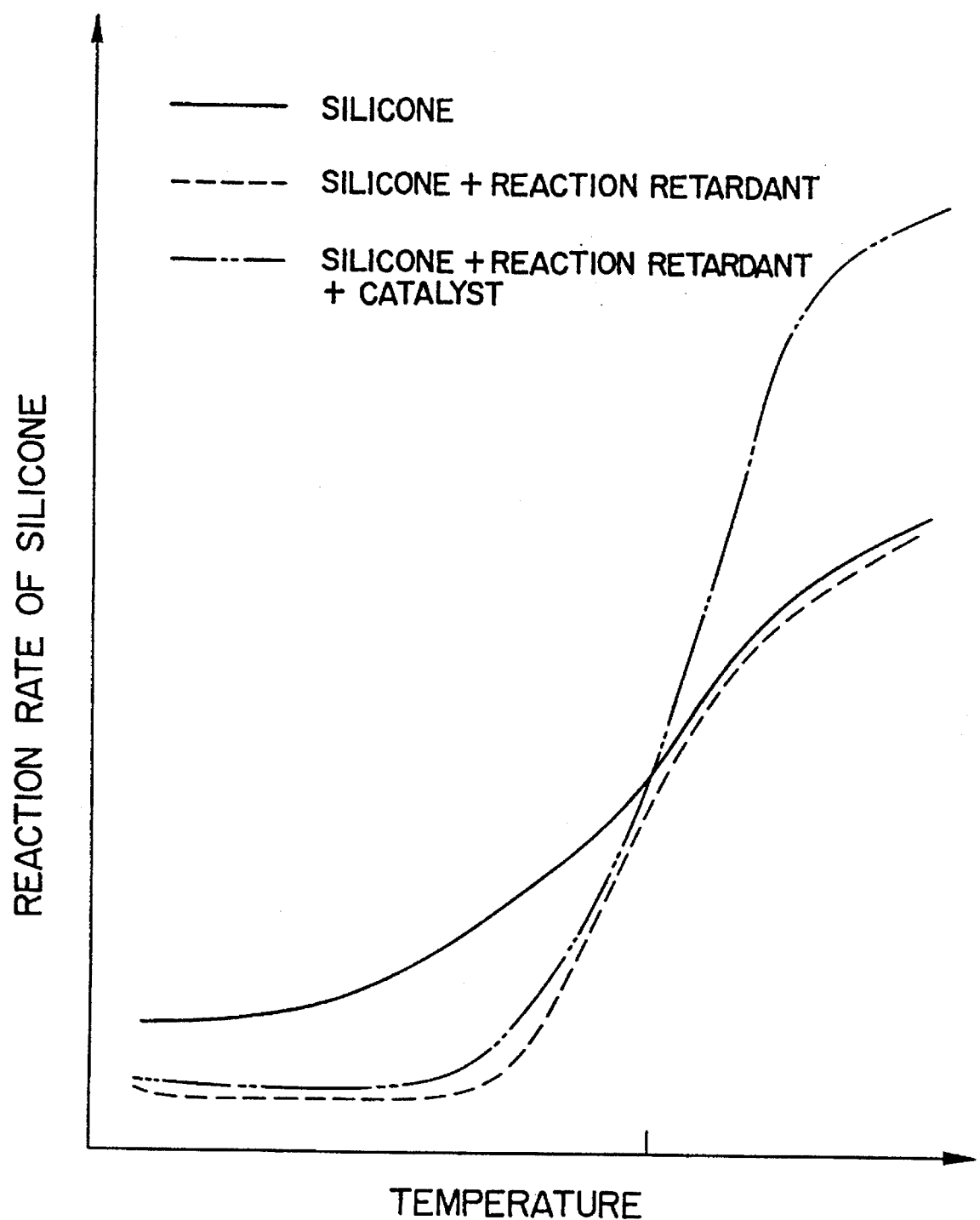
F I G. I

THERMAL TRANSFER IMAGE-RECEIVING SHEET AND PROCESS FOR PRODUCING THE SAME

This a Division of application Ser. No. 08/159,118 filed Nov. 30, 1993, now U.S. Pat. No. 5,430,002.

BACKGROUND OF THE INVENTION

The present invention relates to a thermal transfer image-receiving sheet and more particularly to a thermal transfer image-receiving sheet which exhibits an excellent releasability in the thermal transfer.

Various thermal transfer printing processes are known in the art. One of them is a transfer printing process which comprises supporting a sublimable dye as a recording agent on a substrate sheet, such as a plastic film, to form a thermal transfer sheet and forming various full color images on a dye-receiving layer provided on paper, a plastic film or the like.

In this case, a thermal head of a printer is used as heating means, and a number of color dots of three or four colors are transferred to the thermal transfer image-receiving sheet, thereby reproducing a full color image of an original by means of the multicolor dots.

The above-described thermal transfer process have problems, such as fusing of the thermal transfer sheet and the thermal transfer sheet-receiving sheet to render peeling of both the sheets from each other difficult or to deteriorate the formed image, due to the nature of the process wherein, in the formation of an image, the thermal transfer sheet and thermal transfer image-receiving sheet are put on top of each other with the dye layer of the thermal transfer sheet facing the dye-receiving layer of the thermal transfer image-receiving sheet and both the dye layer and the dye-receiving layer comprise a thermoplastic resin.

In order to solve the above-described problems, a proposal has been made on the addition of a release agent to the dye-receiving layer to bleed out the release agent on the surface of the dye-image receiving layer, thereby forming a release layer.

In this method, when use is made of liquid or wax release agents, they unfavorably contaminate other materials or give rise to discoloration of the image. For this reason, the use of a reactive curing release agent as the release agent has been proposed.

According to this method, after the formation of a dye-receiving layer, heat treatment is effected to bleed out a release agent contained in the dye-receiving layer on the surface of the dye-receiving layer to form a crosslinked thin film of the release agent on the surface of the dye-receiving layer. However, a long period of time is required for the crosslinking reaction, which lowers the productivity. Further, the coating strength of the crosslinked film is so low that the scratch resistance is unsatisfactory. Japanese Patent Laid-Open No. 87424/1991 describes examples of reactive silicones. In these reactive silicones, a reaction should occur between vinyl groups that unfavorably have a low reactivity. Moreover, an image-receiving material comprising an image-receiving layer and a particular silicone crosslinked film provided on the surface of the image-receiving layer is also known in the art (see Japanese Patent Laid-Open No. 116189/1987). This image-receiving material, however, is not always satisfactory.

Accordingly, an object of the present invention is to provide a thermal transfer image-receiving sheet having a dye-receiving layer which is excellent in reaction rate of the release agent, coating strength of the release layer and releasability of the thermal transfer sheet.

DISCLOSURE OF THE INVENTION

The above-described object can be attained by the following present invention. Specifically, the first invention relates to a thermal transfer image-receiving sheet comprising a substrate sheet and a dye-receiving layer provided on at least one surface of said substrate sheet, said dye-receiving layer containing an internally added release agent mixture comprising an addition-polymerizable silicone and a hydrogen-modified silicone. Further, another embodiment of the first invention relates to a thermal transfer image-receiving sheet comprising a substrate sheet and a dye-receiving layer provided on at least one surface of said substrate sheet, said dye-receiving layer having on its surface a release layer comprising an addition-polymerizable silicone and a hydrogen-modified silicone.

The use of a mixture of particular reactive silicones as a release agent can provide a thermal transfer image-receiving sheet having a dye-receiving layer which is excellent in reaction rate of the release agent, coating strength of the release layer and releasability from a thermal transfer sheet.

The second invention relates to a composition for a release layer, comprising a liquid medium and, incorporated as indispensable components in said liquid medium, a reactive silicone, a reaction catalyst and a reaction retardant; a composition for a dye-receiving layer, comprising a liquid medium and, incorporated as indispensable components in said liquid medium, a dye-receiving resin, a reactive silicone, a reaction catalyst and a reaction retardant; and a process for producing a thermal transfer image-receiving sheet using these compositions.

When a dye-receiving layer or a release layer is formed, the use of a coating solution comprising a liquid medium and, incorporated therein as indispensable components, a reactive silicone, a reaction catalyst and a reaction retardant enables the reaction of the release agent to be sufficiently retarded when the release agent is in a coating solution form, while after the formation of the dye-receiving layer or release layer, there occurs a rapid increase in the reaction rate, so that not only the image-receiving sheet can be produced with a high efficiency but also it becomes possible to provide a thermal transfer image-receiving sheet having a dye-receiving layer which is excellent in coating strength of the release layer and releasability from a thermal transfer sheet.

The third invention relates to a process for producing a thermal transfer image-receiving sheet, comprising the steps of: forming a dye-receiving layer on at least one surface of said substrate sheet and forming a release layer on said dye-receiving layer, wherein said release layer comprises a catalyst-curing release agent and a curing catalyst, any one of said release agent and said curing agent is incorporated in a coating solution for a dye-receiving layer in the stage of forming the dye-receiving layer and, after said dye-receiving layer is formed by using said coating solution, any one of said curing catalyst and said release agent is coated on said dye-receiving layer to form said release layer; and a process for producing a thermal transfer image-receiving sheet, comprising the steps of: forming a dye-receiving layer on at least one surface of said substrate sheet and forming a release layer on said dye-receiving layer, wherein said release layer comprises a catalyst-curing release agent and a curing catalyst and, after the formation of said dye-receiving layer, any one of a coating solution containing said release agent and a coating solution containing said curing catalyst is coated on the surface of said dye-receiving layer followed by coating of any one of a coating solution containing said curing catalyst and a coating solution containing said release agent to form said release layer.

In the formation of a release layer comprising a catalyst-curing release agent and a curing agent on the surface of a dye-receiving layer, when the release agent and the curing catalyst are used separately from each other, it becomes possible to produce a thermal transfer image-receiving sheet having a dye-receiving layer which is excellent in coating strength of the release layer and releasability of the thermal transfer image-receiving sheet from a thermal transfer sheet.

BRIEF DESCRIPTION OF THE DRAWING

FIG. 1 is a graph showing the relationship between the reaction rate of reactive silicones and the reaction temperature.

BEST MODE FOR CARRYING OUT THE INVENTION

The present invention will now be described in more detail with reference to the following preferred embodiments of the present invention.
First Invention There is no particular limitation on the substrate sheet used in the present invention, and examples of the substrate sheet usable in the present invention include synthetic paper (polyolefin, polystyrene and other synthetic paper), wood free paper, art paper, coated paper, cast coated paper, wall paper, paper for backing, paper impregnated with a synthetic resin or an emulsion, paper impregnated with a synthetic rubber latex, paper containing an internally added synthetic resin, fiber board, etc., cellulose fiber paper, and films or sheets of various plastics, such as polyolefin, polyvinyl chloride, polyethylene terephthalate, polystyrene, polymethacrylate and polycarbonate. Further, use may be made of a white opaque film or a foamed sheet prepared by adding a white pigment or filler to the above-described synthetic resin and forming a film from the mixture or foaming the mixture.

Further, use may be made of a laminate comprising any combination of the above-described substrate sheets. Typical examples of the laminate include a laminate comprising a combination of a cellulose fiber paper with a synthetic paper and a laminate comprising a combination of a cellulose fiber paper with a plastic film or sheet. The thickness of these substrate sheets maybe arbitrary and is generally in the range of from about 10 to 300 μm.

When the substrate sheet is poor in the adhesion to a receiving layer formed on the surface thereof, it is preferred that the surface of the substrate sheet be subjected to a primer treatment or a corona discharge treatment.

The dye-receiving layer formed on the surface of the substrate sheet serves to receive a sublimable dye moved from the thermal transfer sheet and to maintain the formed image.

The dye-receiving layer may comprise a resin, and examples of the resin include polyolefin resins, such as polypropylene, halogenated polymers, such as polyvinyl chloride and polyvinylidene chloride, vinyl polymers, such as polyvinyl acetate and polyacrylic esters, polyester resins, such as polyethylene terephthalate and polybutylene terephthalate, polystyrene resins, polyamide resins, copolymer resins comprising olefins, such as ethylene or propylene, and other vinyl monomers, ionomers, cellulosic resins, such as cellulose diacetate, and polycarbonates. Among them, vinyl resins and polyester resins are particularly preferred.

The thermal transfer image receiving sheet of the present invention can be formed by coating at least one surface of the above-described substrate sheet with a suitable organic solvent solution or water or organic solvent dispersion of the above-described resin containing the following particular reactive silicone release agent mixture and other necessary additives, for example, by a gravure printing method, a screen printing method or a reverse roll coating method wherein use is made of a gravure print, and drying the resultant coating to form a dye-receiving layer. In this case, at least part of the release agent mixture contained in the dye-receiving layer is bled out on the surface of the dye-receiving layer upon heat drying of the coating solution, and the release agent mixture gives rise to some reaction within or on the surface of the dye-receiving layer to form a release layer on the surface of the dye-receiving layer.

In the formation of the above-described dye-receiving layer, pigments or fillers, such as titanium oxide, zinc oxide, kaolin clay, calcium carbonate and finely divided silica, may be added for the purpose of improving the whiteness of the dye-receiving layer to further enhance the sharpness of the transferred image.

Although the thickness of the dye-receiving layer thus formed may be arbitrary, it is generally in the range of from 1 to 50 μm. The above-described dye-receiving layer maybe in the form of either a continuous coating formed by coating the dispersion and then heating the resultant coating to a relatively high temperature, or a discontinuous coating formed by using a resin emulsion or a resin dispersion.

In the present invention, one of the release agents comprises a silicone compound having an addition-polymerizable group for the purpose of imparting releasability to the dye-receiving layer, and one example of such a silicone compound include compounds represented by the following formula:

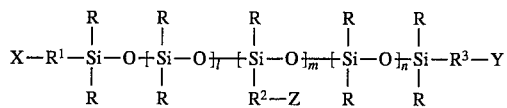

In the above formula, R is mainly a methyl group but may represents other alkyl groups or aryl groups, such as a phenyl group, or any combination thereof. $l+m+n$ is an integer of 1 or more, and the respective siloxane units may be located at random. At least one of X, Y and Z represents an addition-polymerizable group, such as a vinyl group, an allyl ($-CH_2CH=CH_2$) group or a (meth)acryloyl group, and $R^1$ to $R^3$ represent a single bond or an alkylene group.

The molecular weight of the addition-polymerizable silicones is not particularly limited. In general, however, it is preferably in the range of from 3500 to 20,000. These addition-polymerizable silicones may be commercially available and can be easily used in the present invention.

The hydrogen-modified silicone used in combination with the addition-polymerizable silicone according to the present invention may be represented by the same general formula as described above, except that at least one of $-R^1-X$, $-R^2-Z$ and $-R^3-Y$ represents a hydrogen atom. Other substituents, arrangement of siloxane units and the molecular weight are the same as those described above in connection with the above general formula. It is preferred that the addition-polymerizable silicone and hydrogen-modified silicone are modified with an aryl group such as a phenyl group. The introduction of the aryl group generally improves the compatibility of these silicones with thermoplastic resins, which leads to an advantage that, when they are mixed with a resin for use of the mixture as a dye-receiving layer or a release layer, the composition for forming the dye-receiving layer or release layer is less likely to cause problems, such as occurrence of clouding or separation and cissing, so that a good coated surface can be easily provided. Further, since they are mixed with the resin to a suitable extent, the strength Of the resultant coating can be advantageously improved.

Moreover, since the affinity for a disperse dye is also improved, the inhibition of dyeing is less likely to occur. In particular, when the composition is coated on a dye-receiving layer, it is possible to attain a combination of a satisfactory releasability with a satisfactory dyeing density.

Still preferred addition-polymerizable silicones and hydrogen-modified silicones are represented by the following respectively structural formulae.

Addition-polymerizable silicones:

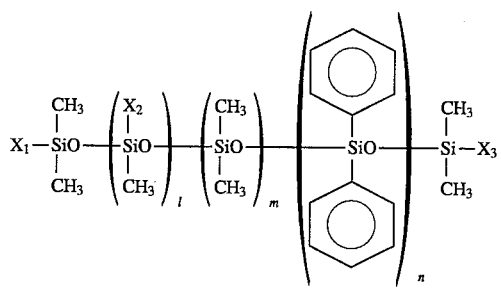

wherein $X_1$, $X_2$ and $X_3$ each independently represent a $-CH=CH_2$ or $-CH_3$ group, provided that at least one of $X_1$, $X_2$ and $X_3$ represents a $-CH=CH_2$ group, $1+m+n$ is an integer of 1 or more and the respective siloxane units may be located at random.

Hydrogen-modified silicones:

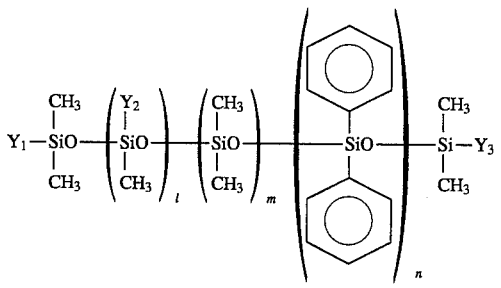

wherein $Y_1$, $Y_2$ and $Y_3$ each independently represent a hydrogen atom or a $-Ch_3$ group, provided that at least one of $Y_1$, $Y_2$ and $Y_3$ represents a hydrogen atom, $1+m+n$ is an integer of 1 or more and the respective siloxane units may be located at random.

The diphenyl siloxane unit content is preferably in the range of from 5 to 50% by mole based on the whole siloxane unit. When it is less than 5% by mole, the compatibility with the resin for forming the dye-receiving layer becomes so unsatisfactory that the composition for forming the dye-receiving layer is likely to cause unfavorable phenomena, such as clouding, separation, etc., which makes it impossible to provide a homogeneously coated surface or gives rise to a lowering in coating strength of the dye-receiving layer. Further, in this case, since bleedout of the silicone becomes excessive, the coefficient of friction of the surface of the dye-receiving layer is remarkably lowered, so that there is a possibility that printing under some conditions gives rise to a problem such as oblique motion during printing or misregistration during three-color printing.

The proportion of the addition-polymerizable silicone and the hydrogen-modified silicone used is determined depending upon the molar ratio of reactive groups contained respectively in both the silicones. The molar ratio of the reactive group contained in the addition polymerizable silicone to the reactive group contained in the hydrogen-modified silicone is preferably in the range of from 4:1 to 1:4, particularly preferably in the range of from 1:1 to 1:3. When the molar ratio is outside this range, there occur a lowering in releasability, a lowering in coating strength and a deterioration in storage stability due to the presence of the reactive group remaining unreacted, so that the performance of the resultant thermal transfer image-receiving sheet is unsatisfactory. It is preferred to use the release agent mixture in an amount in the range of from about 2 to 20 parts by weight based on 100 parts by weight of the resin for forming the dye-receiving layer.

When use is made of the above-described release agent mixture, it is also possible to use a curing catalyst suitable for use in combination with the adopted release agent. The curing catalyst is also commercially available, and various radical generation polymerization catalysts, platinum-based catalysts, etc. are usable. Among them, the platinum-based catalysts are particularly suitable. The amount of the catalyst used is preferably in the range of from about 5 to 200 parts by weight based on 100 parts by weight of the reactive silicone release agent. The use of these catalysts is not essential, and some release agents can give rise to a reaction simply by heating without use of any catalyst. It is also possible to further add an epoxy-modified silicone or the like for the purpose of improving the lubricity of the thermal transfer image-receiving sheet.

In another embodiment of the present invention, a dye-receiving layer is once formed without adding the above-described release agent mixture to the coating solution for forming the dye-receiving layer, and a coating solution containing the above-described release agent mixture (and optionally a curing catalyst) is coated on the surface of the dye-receiving layer to form a coating that is then dried and cured by heating to form a release layer.

In this case, as described above, the addition-polymerizable silicone and the hydrogen-modified silicone should be modified with an aryl group, such as a phenyl group, for the purpose of enhancing the coatability of the composition to prevent cissing or the like in the formation of a release layer, the adhesion between the release layer and the surface of the dye-receiving layer after the formation of the release layer and the penetration of the sublimable dye transferred from the thermal transfer sheet during printing. The use of the silicone modified with the aryl group contributes to an improvement in the affinity for the resin used in the dye-receiving layer and the sublimable dye transferred from the thermal transfer sheet. Further, it is also possible to use a thermoplastic resin as a resin binder in an amount of about 1 to 50 parts by weight based on one part by weight of the release agent mixture for the purpose of improving the film formability and strength of the release layer and, at the same time, improving the penetration of the dye.

Although the resin used as the binder is not particularly limited, it is preferably selected from the above-described resins for forming the dye-receiving layer.

With the consideration of the adhesion of the release layer to the dye-receiving layer and the coated surface, the binder resin for the release layer is preferably the same as at least one resin component of the dye-receiving layer. Further, even when use is made of a resin binder, the use of the aryl-modified silicone is preferred form the viewpoint of the affinity for the resin used in the dye-receiving layer and the sublimable dye transferred from the thermal transfer sheet.

With respect to the formation of the release layer, coating of the coating solution for the release layer, drying and heating of the resultant coating, aging, etc. may be effected in the same manner as that used in the formation of the dye-receiving layer, and the thickness of the release layer is preferably in the range of from 0.01 to 20 μm.

The thermal transfer image-receiving sheet of the present invention can be applied also to various applications where thermal transfer recording can be conducted, such as image-receiving sheets, cards and sheets for preparing transparent originals, by properly selecting the substrate sheet.

Further, in the image-receiving sheet of the present invention, a cushion layer may be optionally provided between the substrate sheet and the dye-receiving layer, and the provision of the cushion layer enables an image less susceptible to noise during printing and corresponding to image information to be formed by transfer recording with a good reproducibility.

The cushion layer may comprise, for example, a polyurethane resin, an acrylic resin, a polyethylene resin, a butadiene rubber or an epoxy resin. The thickness of the cushion layer is preferably in the range of from about 2 to 20 μm.

It is also possible to provide a lubricant layer on the back surface of the substrate sheet. The lubricant layer may comprise a methacrylate resin, such as methyl methacrylate, or a corresponding acrylate resin, a vinyl resin, such as a vinyl chloride/vinyl acetate copolymer, or the like.

Further, the image-receiving sheet may be provided with a detection mark. The detection mark is very convenient for registration of the thermal transfer sheet with the image-receiving sheet. For example, a detection mark detectable with a phototube detection device can be provided on the back surface of the substrate sheet or other place by printing or the like.

The thermal transfer sheet for use in the case where thermal transfer is conducted through the use of the above-described thermal transfer image-receiving sheet of the present invention may comprise a paper or a polyester film and, provided thereon, a dye layer containing a sublimable dye, and any conventional thermal transfer sheet, as such, may be used in the present invention.

Means for applying a thermal energy at the time of the thermal transfer may be any means known in the art. For example, a desired object can be sufficiently attained by applying a thermal energy of about 5 to 100 mJ/mm² through the control of a recording time by means of a recording device, for example, a thermal printer (for example, a video printer VY-100 manufactured by Hitachi, Limited).

Second Invention

An object of the second invention is to provide compositions for a dye-receiving layer and a release layer and a process for producing a thermal transfer image-receiving sheet using the compositions, which compositions enable the reaction of the release agent to be sufficiently retarded when the release agent is in a coating solution form, while after the formation of the dye-receiving layer or release layer, heating gives rise to a rapid increase in the reaction rate, so that not only the image-receiving sheet can be produced with a high efficiency but also it becomes possible to provide a thermal transfer image-receiving sheet having a dye-receiving layer which is excellent in coating strength of the release layer and releasability from a thermal transfer sheet.

The composition for a release layer according to the present invention is characterized by comprising a liquid medium and, incorporated therein as indispensable components, a reactive silicone, a reaction catalyst and a reaction retardant.

The composition for a dye-receiving layer according to the present invention is characterized by comprising a liquid medium and, incorporated as indispensable components in said liquid medium, a dye-receiving resin, a reactive silicone, a reaction catalyst and a reaction retardant.

Preferred examples of the reactive silicone used in the present invention include modified silicone oils such as epoxy-modified, alkyl-modified, amino-modified, carboxyl-modified, alcohol-modified, fluorine-modified, alkylaralkylpolyether-modified, epoxy-polyether-modified, polyether-modified, addition-polymerizable and hydrogen-modified silicones.

These reactive silicone oils are preferably used in the form of a combination of compounds reactive with each other, for example, a combination of an amino-modified silicone oil with an epoxy-modified silicone oil. However, it is also possible to use them in such a manner that the same kind of silicone oils, for example, amino-modified silicones or alcohol-modified silicones, are reacted with each other though a crosslinking agent such as a polyisocyanate. A combination of an addition-polymerizable silicone with a hydrogen-modified silicone is particularly preferred.

In the present invention, one example of particularly preferred addition-polymerizable silicone include compounds represented by the following formula:

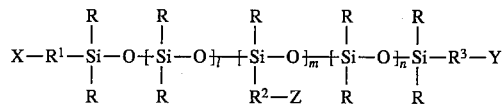

In the above formula, R is mainly a methyl group but may represents other alkyl groups or aryl groups, such as a phenyl group, or any combination thereof. 1+m+n is an integer of 1 or more, and the respective siloxane units may be located at random. At least one of X, Y and Z represents an addition-polymerizable group, such as a vinyl group, an allyl (—CH$_2$—CH=CH$_2$) group or a (meth)acryloyl group, and R$^1$ to R$^3$ represent a single bond or an alkylene group.

The molecular weight of the addition-polymerizable silicones is not particularly limited. In general, however, it is preferably in the range of from 3500 to 20,000. These addition-polymerizable silicones may be commercially available and can be easily used in the present invention.

The hydrogen-modified silicone used in combination with the addition-polymerizable silicone according to the present invention may be represented by the same general formula as described above, except that at least one of —R$^1$—X, —R$^2$—Y—Z and —R$^3$—Y represents a hydrogen atom. Other substituents, arrangement of siloxane units and the molecular weight are the same as those described above in connection with the above general formula. These addition-polymerizable silicones are commercially available and can be easily used in the present invention.

The proportion of the addition-polymerizable silicone and the hydrogen-modified silicone used is determined depending upon the molar ratio of reactive groups contained respectively in both the silicones. The molar ratio of the reactive group contained in the addition polymerizable silicone to the reactive group contained in the hydrogen-modified silicone is preferably in the range of from 4:1 to 1:4, particularly preferably in the range of from 1:1 to 1:3. When the molar ratio is outside this range, there occur a lowering in releasability, a lowering in coating strength and a deterioration in storage stability due to the presence of the reactive group remaining unreacted, so that the performance of the resultant thermal transfer image-receiving sheet is unsatisfactory. It is preferred to use the release agent mixture in an amount in the range of from about 2 to 20 parts by weight based on 100 parts by weight of the resin for forming the dye-receiving layer.

When the use of the reactive silicones alone is unsatisfactory for the reaction, it becomes necessary to use a catalyst for sufficiently reacting them with each other. The curing catalyst used in combination with the above-described release agents is preferably compatible with the selected reactive silicones or a combination thereof. For example, various radical generation polymerization catalysts, platinum-based catalysts, etc. are usable. Among them, the platinum-based catalysts are particularly suitable. The amount of the Catalyst used is preferably in the range of from about 5 to 200 parts by weight based on 100 parts by weight of the reactive silicone.

When the above-described reactive silicones are present together with the catalyst, they are reacted with each other even at room temperature. The progress of the reaction in the coating solution is causative of a lowering in the releasability, which leads to problems of storage stability, handleability of the coating solution, etc. In the present invention, in order to eliminate the above-described problems, use is made of a reaction retardant that has the effect of suppressing the reaction of the reactive silicones at room temperature and loses the effect during heat treatment. The reaction retardant used in the present invention comprises such a material as will suppress the action of the curing catalyst on the reactive silicones when it is in a solvent solution form but accelerate the action of the curing catalyst without suppressing the action when it is in a heated or dried state. Examples of such reaction retardants include silylation products of acetylenic alcohols. These reaction retardants are commercially available and can be used in the present invention. The amount of the reaction retardant used is preferably in the range of from about 5 to 100 parts by weight based on 100 parts by weight of the reactive silicone.

In the composition, the liquid medium for dissolving or dispersing the above-described indispensable components may be any of organic solvents commonly used in compositions for gravure printing, and suitable examples thereof include methyl ethyl ketone, toluene, xylene, ethyl acetate, cellosolves and methyl isobutyl ketone and mixed solvents comprising the above-described solvents.

The composition for the release layer according to the present invention comprises the above-described indispensable components that generally occupy about 10 to 40% by weight in terms of solid matter content based on the whole composition. The composition for the release layer can be easily prepared by homogeneously mixing and dissolving individual components in the liquid medium. The coating composition will be hereinafter referred to also as "ink" according to the usual terminology practice in the art.

In the above-described ink of the present invention, the above-described thermoplastic resin capable of receiving a dye can also be added in the amount of about 4 to 50 parts by weight based on one part by weight of the reactive silicone for the purpose of improving the film property of the release layer. Further, the ink can be used as an ink for forming a dye-receiving layer by adding as the binder component the resin capable of receiving a dye in a high concentration, for example, in an amount of about 100 to 5000 parts by weight based on 100 parts by weight of the release agent component. In this case, not only the ink can be used for the formation of the dye-receiving layer but also good releasability can be imparted to the dye-receiving layer.

Examples of the substrate sheet used for the production of the thermal transfer sheet according to the present invention include synthetic paper (polyolefin, polystyrene and other synthetic paper), wood free paper, art paper, coated paper, cast coated paper, wall paper, paper for backing, paper impregnated with a synthetic resin or an emulsion, paper impregnated with a synthetic rubber latex, paper containing an internally added synthetic resin, fiber beard, etc., cellulose fiber paper, and films or sheets of various plastics, such as polyolefin, polyvinyl chloride, polyethylene terephthalate, polystyrene, polymethacrylate and polycarbonate. Further, use may be made of a white opaque film or a foamed sheet prepared by adding a white pigment or filler to the above-described synthetic resin and forming a film from the mixture or foaming the mixture.

Further, use may be made of a laminate comprising any combination of the above-described substrate sheets. Typical examples of the laminate include a laminate comprising a combination of a cellulose fiber paper with a synthetic paper and a laminate comprising a combination of a cellulose fiber paper with a plastic film or sheet. The thickness of these substrate sheets may be arbitrary and is generally in the range of from about 10 to 300 μm. When the substrate sheet is poor in the adhesion to a receiving layer formed on the surface thereof, it is preferred that the surface of the substrate sheet be subjected to a primer treatment or a corona discharge treatment.

The dye-receiving layer formed on the surface of the substrate sheet serves to receive a sublimable dye moved from the thermal transfer sheet and to maintain the formed image. The dye-receiving layer may comprise a resin, and examples of the resin include polyolefin resins, such as polypropylene, halogenated polymers, such as polyvinyl chloride and polyvinylidene chloride, vinyl polymers, such as polyvinyl acetate and polyacrylic esters, polyester resins, such as polyethylene terephthalate and polybutylene terephthalate, polystyrene resins, polyamide resins, copolymer resins comprising olefins, such as ethylene or propylene, and other vinyl monomers, ionomers, cellulosic resins, such as cellulose diacetate, and polycarbonates. Among them, vinyl resins and polyester resins are particularly preferred.

The thermal transfer image receiving sheet of the present invention can be formed by coating at least one surface of the above-described substrate sheet with a suitable organic solvent solution or water or organic solvent dispersion of the above-described indispensable components in the ink for a dye-receiving layer and containing other necessary additives, for example, by a gravure printing method, a screen printing method or a reverse roll coating method wherein use is made of a gravure print, and drying the resultant coating to form a dye-receiving layer. In this case, at least part of the release agent mixture contained in the dye-receiving layer is bled out on the surface of the dye-receiving layer upon heat drying of the coating solution, and the release agent mixture gives rise to some reaction within or on the surface of the dye-receiving layer to form a release layer on the surface of the dye-receiving layer.

In the formation of the above-described dye-receiving layer, pigments or fillers, such as titanium oxide, zinc oxide, kaolin clay, calcium carbonate and finely divided silica, may be added for the purpose of improving the whiteness of the dye-receiving layer to further enhance the sharpness of the transferred image.

Although the thickness of the dye-receiving layer thus formed may be arbitrary, it is generally in the range of from 1 to 50 µm. The above-described dye-receiving layer may be in the form of either a continuous coating formed by coating the dispersion and then heating the resultant coating to a relatively high temperature, or a discontinuous coating formed by using a resin emulsion or a resin dispersion, In another embodiment of the present invention, a dye-receiving layer is once formed without adding the above-described indispensable components of the ink for the release layer to the coating solution for forming the dye-receiving layer, and the ink for the release layer is coated on the surface of the dye-receiving layer to form a coating that is then dried and cured by heating to form a release layer.

With respect to the formation of the release layer, coating of the coating solution for the release layer, drying and heating of the resultant coating, aging, etc. may be effected in the same manner as that used in the formation of the dye-receiving layer, and the thickness of the release layer is preferably in the range of from 0.01 to 20 µm.

The image-receiving sheet of the present invention can be applied also to various applications where thermal transfer recording can be conducted, such as image-receiving sheets, cards and sheets for preparing transparent originals, by properly selecting the substrate sheet.

Further, in the image-receiving sheet of the present invention, a cushion layer may be optionally provided between the substrate sheet and the dye-receiving layer, and the provision of the cushion layer enables an image less susceptible to noise during printing and corresponding to image information to be formed by transfer recording with a good reproducibility.

The cushion layer may comprise, for example, a polyurethane resin, an acrylic resin, a polyethylene resin, a butadiene rubber or an epoxy resin. The thickness of the cushion layer is preferably in the range of from about 2 to 20 µm.

It is also possible to provide a lubricant layer on the back surface of the substrate sheet. The lubricant layer may comprise a methacrylate resin, such as methyl methacrylate, or a corresponding acrylate resin, a vinyl resin, such as a vinyl chloride/vinyl acetate copolymer, or the like.

Further, the image-receiving sheet may be provided with a detection mark. The detection mark is very convenient for registration of the thermal transfer sheet with the image-receiving sheet. For example, a detection mark detectable with a phototube detection device can be provided on the back surface of the substrate sheet or other place by printing or the like.

The thermal transfer sheet for use in the case where thermal transfer is conducted through the use of the above described thermal transfer image-receiving sheet of the present invention may comprise a paper or a polyester film and, provided thereon, a dye layer containing a sublimable dye, and any conventional thermal transfer sheet, as such, may be used in the present invention.

Means for applying a thermal energy at the time of the thermal transfer may be any means known in the art. For example, a desired object can be sufficiently attained by applying a thermal energy of about 5 to 100 mJ/mm$^2$ through the control of a recording time by means of a recording device, for example, a thermal printer (for example, a video printer VY-100 manufactured by Hitachi, Limited).

Third Invention

The third invention will now be described.

Examples of the substrate sheet used for the production of the thermal transfer sheet according to the present invention include synthetic paper (polyolefin, polystyrene and other synthetic paper), wood free paper, art paper, coated paper, cast coated paper, wall paper, paper for backing, paper impregnated with a synthetic resin or an emulsion, paper impregnated with a synthetic rubber latex, paper containing an internally added synthetic resin, fiber board, etc., cellulose fiber paper, and films or sheets of various plastics, such as polyolefin, polyvinyl chloride, polyethylene terephthalate, polystyrene, polymethacrylate and polycarbonate. Further, use may be made of a white opaque film or a foamed sheet prepared by adding a white pigment or filler to the above-described synthetic resin and forming a film from the mixture or foaming the mixture.

Further, use may be made of a laminate comprising any combination of the above-described substrate sheets. Typical examples of the laminate include a laminate comprising a combination of a cellulose fiber paper with a synthetic paper and a laminate comprising a combination of a cellulose fiber paper with a plastic film or sheet. The thickness of these substrate sheets may be arbitrary and is generally in the range of from about 10 to 300 µm. When the substrate sheet is poor in the adhesion to a receiving layer formed on the surface thereof, it is preferred that the surface of the substrate sheet be subjected to a primer treatment or a corona discharge treatment.

The dye-receiving layer formed on the surface of the substrate sheet serves to receive a sublimable dye moved from the thermal transfer sheet and to maintain the formed image. The dye-receiving layer may comprise a resin, and examples of the resin include polyolefin resins, such as polypropylene, halogenated polymers, such as polyvinyl chloride and polyvinylidene chloride, vinyl polymers, such as polyvinyl acetate and polyacrylic esters, polyester resins, such as polyethylene terephthalate and polybutylene terephthalate, polystyrene resins, polyamide resins, copolymer resins comprising olefins, such as ethylene or propylene, and other vinyl monomers, ionomers, cellulosic resins, such as cellulose diacetate, and polycarbonates. Among them, vinyl resins and polyester resins are particularly preferred.

In one embodiment of the present invention, at least one surface of the above-described substrate sheet is coated with a suitable organic solvent solution or water or organic solvent dispersion of a mixture comprising the above-described resin for a dye-receiving layer and, added thereto, any one of a catalyst curing release agent and a curing catalyst as an indispensable component and other necessary additives, for example, by a gravure printing method, a screen printing method or a reverse roll coating method wherein use is made of a gravure print, the resultant coating is dried and heated to bleed out the catalyst curing release agent or curing catalyst on the surface of the dye-receiving layer, and a coating solution containing a curing catalyst or a catalyst curing release agent is coated on the surface of the catalyst curing release agent or curing catalyst bled out from the dye-receiving layer to form a cured release layer on the surface of the dye-receiving layer.

In another embodiment of the present invention, after a dye-receiving layer is formed on the surface of a substrate sheet in the same manner as that used in the prior art, a coating solution containing a catalyst curing release agent or a coating solution containing a curing catalyst is coated on the surface of the dye-receiving layer followed by coating of any one of a coating solution containing a curing catalyst and a coating solution containing a release agent to form a release layer.

In the prior art, since both the catalyst curing release agent and the curing catalyst are added to the coating solution for the dye-receiving layer, the stability of the coating solution is poor. Further, in this case, since the catalyst curing release agent and the curing catalyst are reacted with each other during the formation of the dye-receiving layer, the bleedout of the release agent on the surface of the dye-receiving layer is unsatisfactory. The present invention can solve these drawbacks of the prior art.

Although the thickness of the dye-receiving layer may be arbitrary, it is generally in the range of from 1 to 50 μm. Further, although the dye-receiving layer preferably comprises a continuous coating, it may be in the form of a discontinuous coating formed by using a resin emulsion or a resin dispersion.

In the formation of the above-described dye-receiving layer, pigments or fillers, such as titanium oxide, zinc oxide, kaolin clay, calcium carbonate and finely divided silica, may be added for the purpose of improving the whiteness of the dye-receiving layer to further enhance the sharpness of the transferred image.

The catalyst curing release agent may be any one used in the art, and preferred examples thereof include modified silicone oils such as epoxy-modified, alkyl-modified, amino-modified, carboxyl-modified, alcohol-modified, fluorine-modified, alkylaralkylpolyether-modified, epoxy-polyether-modified, polyether-modified, addition-polymerizable and hydrogen-modified silicones. Among them, a combination of an addition-polymerizable silicone with a hydrogen-modified silicone is particularly preferred.

These reactive silicone oils are preferably used in the form of a combination of compounds reactive with each other, for example, a combination of an amino-modified silicone oil with an epoxy-modified silicone oil. However, it is also possible to use them in such a manner that the same kind of silicone oils, for example, amino-modified silicones or alcohol-modified silicones, are reacted with each other though a crosslinking agent such as a polyisocyanate.

In the present invention, platinum-based catalysts, radical generation catalysts, etc. may be used as the curing catalyst. Among them, platinum-based catalysts are particularly preferred.

The amount of the release agent used is preferably in the range of from 2 to 30 parts by weight based on 100 parts by weight of the resin for forming the dye-receiving layer, and the amount of the curing catalyst used is preferably in the range of from 4 to 120 parts by weight based on 100 parts by weight of the release agent.

In the present invention, when the catalyst curing release agent is incorporated in the coating solution for the dye-receiving layer, a coating solution containing a curing catalyst is coated on the release agent bled out on the surface of the dye-receiving layer to react the catalyst curing release agent with the curing catalyst, thereby forming a cured release layer. In the coating solution, the liquid medium for dissolving or dispersing the curing catalyst may be any organic solvent commonly used in coating solutions for the gravure printing method, and preferred examples thereof include methyl ethyl ketone, toluene, xylene, ethyl acetate, cellosolves and methyl isobutyl ketone and mixed solvents comprising the above-described solvents. In preparing these coating solutions, the above-described resin for forming the dye-receiving layer may be used as a binder or a film forming assistant in such an amount as will not be detrimental to the releasability of the resultant release layer.

In the present invention, when a curing catalyst is incorporated in the coating solution for the dye-receiving layer, a coating solution containing a catalyst curing release agent is coated on the curing catalyst bled out on the surface of the dye-receiving layer to react the curing catalyst with the catalyst curing release agent, thereby forming a cured release layer. The organic solvents described above in connection with the liquid medium for dissolving or dispersing the curing catalyst may be used also as the liquid medium for dissolving or dispersing the catalyst curing release agent. Further, as with the coating solution containing the catalyst curing release agent, the above-described resin for forming the dye-receiving layer may be used as a binder or a film forming assistant.

In another embodiment of the present invention, after a dye-receiving layer is once formed, a cured release layer is formed by using the coating solution containing a release agent and the coating solution containing a curing agent in the above-described manner. In this case, the individual coating solutions may be the same as those described in the above-described embodiment.

In the above-described method for forming a release layer, a release layer having an excellent releasability can be formed by coating of a coating solution containing a curing catalyst or a catalyst curing release agent, drying and heating of the resulting coating, aging, etc. The thickness of the release layer is preferably in the range of from 0.01 to 20 μm.

The image-receiving sheet of the present invention can be applied to various applications where thermal transfer recording can be conducted, such as image-receiving sheets, cards and sheets for preparing transparent originals, by properly selecting the substrate sheet.

Further, in the image-receiving sheet of the present invention, a cushion layer may be optionally provided between the substrate sheet and the dye-receiving layer, and the provision of the cushion layer enables an image less susceptible to noise during printing and corresponding to image information to be formed by transfer recording with a good reproducibility.

The cushion layer may comprise, for example, a polyurethane resin, an acrylic resin, a polyethylene resin, a butadiene rubber or an epoxy resin. The thickness of the cushion layer is preferably in the range of from about 2 to 20 μm.

It is also possible to provide a lubricant layer on the back surface of the substrate sheet. The lubricant layer may comprise a methacrylate resin, such as methyl methacrylate, or a corresponding acrylate resin, a vinyl resin, such as a vinyl chloride/vinyl acetate copolymer, or the like.

Further, the image-receiving sheet may be provided with a detection mark. The detection mark is very convenient for registration of the thermal transfer sheet with the image-receiving sheet. For example, a detection mark detectable with a phototube detection device can be provided on the back surface of the substrate sheet or other place by printing or the like.

The thermal transfer sheet for use in the case where thermal transfer is conducted through the use of the above-described thermal transfer image-receiving sheet of the present invention may comprise a paper or a polyester film and, provided thereon, a dye layer containing a sublimable dye, and any conventional thermal transfer sheet, as such, may be used in the present invention.

Means for applying a thermal energy at the time of the thermal transfer may be any means known in the art. For example, a desired object can be sufficiently attained by applying a thermal energy of about 5 to 100 mJ/mm² through the control of a recording time by means of a recording device, for example, a thermal printer (for example, a video printer VY-100 manufactured by Hitachi, Limited).

EXAMPLES

The present invention will now be described in more detail with reference to the following Reference Example, Examples and Comparative Examples. In the Reference Example, Examples and Comparative Examples, "parts" or "%" is by weight unless otherwise specified.

Details of addition-polymerizable silicones and hydrogen-modified silicones used in the Examples are given in the following Tables A1 and A2.

TABLE A1

(Addition-Polymerizable Silicone)

| No. | Molecular weight | Content of siloxane unit having vinyl group (mol %)* | Content of siloxane unit having phenyl group (mol %)* | Content of dimethyl siloxane unit (mol %)* | Position of vinyl group |
|-----|------------------|------|------|------|----------------------|
| A | 7,000 | 13 | 30 | 57 | End + side chain |
| B | 20,000 | 6 | 15 | 79 | End + side chain |
| C | 15,000 | 8 | 30 | 62 | Both ends + side chain |
| D | 7,000 | 13 | 30 | 57 | Both ends |

Note: Methylsiloxane, phenylsiloxane and addition-polymerizable siloxane units in the side chain are located at random.
*: Proportion based on the whole siloxane unit.

TABLE A2

(Hydrogen-Modified Silicone)

| No. | Molecular weight | Content of siloxane unit having hydrogen atom (mol %)* | Content of siloxane unit having phenyl group (mol %)* | Content of dimethyl siloxane unit (mol %)* | Position of hydrogen atom |
|-----|------------------|------|------|------|----------------------|
| a | 7,000 | 13 | 30 | 57 | Side chain |
| b | 15,000 | 8 | 20 | 72 | End + side chain |
| c | 7,000 | 8 | 30 | 62 | Both ends + side chain |

Note: Methylsiloxane, phenylsiloxane and hydrogensiloxane units in the side chain are located at random.
*: Proportion based on the whole siloxane unit.

Example A1

Synthetic paper (Yupo-FRG-150 having a thickness of 150 μm; manufactured by Oji-Yuka Synthetic Paper Co., Ltd.) was used as a substrate sheet, and a coating solution having the following composition was coated by means of a bar coater on one surface of the synthetic paper so that the coverage on a dry basis was 5.0 g/m², and the resultant coating was dried with a drier and then heat-treated in an oven at about 130° C. for 30 sec to form a dye-receiving layer, thereby providing a thermal transfer image-receiving sheet of the present invention.

| Composition of coating solution: | |
|---|---|
| Vinyl chloride/vinyl acetate copolymer (#1000A manufactured by Denki Kagaku Kogyo K.K.) | 80 parts |
| Polyester resin (Vylon 600 manufactured by Toyobo Co., Ltd.) | 20 parts |
| Release agent No. A | 2 parts |
| Release agent No. a | 4 parts |
| Epoxy-modified silicone (X22-3000T manufactured by The Shin-Etsu Chemical Co., Ltd.) | 6 parts |
| Platinum-based curing catalyst (PL-50T manufactured by The Shin-Etsu Chemical Co., Ltd.) | 3 parts |
| Methyl ethyl ketone/toluene (weight ratio: 1/1) | 400 parts |

Example A2

A thermal transfer image-receiving sheet of the present invention was provided in the same manner as that of Example A1, except that the following coating solution was used instead of the coating solution used in Example A1 to form a dye-receiving layer.

| Composition of coating solution: | |
|---|---|
| Vinyl chloride/vinyl acetate copolymer (#1000A manufactured by Denki Kagaku Kogyo K.K.) | 80 parts |
| Polyester resin (Vylon 600 manufactured by Toyobo Co., Ltd.) | 20 parts |
| Release agent No. B | 2 parts |
| Release agent No. a | 4 parts |
| Platinum-based curing catalyst (PL-50T manufactured by The Shin-Etsu Chemical Co., Ltd.) | 3 parts |
| Methyl ethyl ketone/toluene (weight ratio: 1/1) | 400 parts |

Example A3

A thermal transfer image-receiving sheet of the present invention was provided in the same manner as that of Example A1, except that the following coating solution was used instead of the coating solution used in Example A1 to form a dye-receiving layer.

| Composition of coating solution: | |
| --- | --- |
| Vinyl chloride/vinyl acetate copolymer (#1000GK manufactured by Denki Kagaku Kogyo K.K.) | 75 parts |
| Polyester resin (Vylon 200 manufactured by Toyobo Co., Ltd.) | 25 parts |
| Release agent No. C | 2 parts |
| Release agent No. b | 5 parts |
| Platinum-based curing catalyst (PL-50T manufactured by The Shin-Etsu Chemical Co., Ltd.) | 4 parts |
| Methyl ethyl ketone/toluene (weight ratio: 1/1) | 400 parts |

Example A4

A thermal transfer image-receiving sheet of the present invention was provided in the same manner as that of Example A1, except that the following coating solution was used instead of the coating solution used in Example A1 to form a dye-receiving layer.
Composition of coating solution:

| Composition of coating solution: | |
| --- | --- |
| Vinyl chloride/vinyl acetate copolymer (#1000GK manufactured by Denki Kagaku Kogyo K.K.) | 75 parts |
| Polyester resin (Vylon 200 manufactured by Toyobo Co., Ltd.) | 25 parts |
| Release agent No. D | 3 parts |
| Release agent No. c | 9 parts |
| Platinum-based curing catalyst (PL-50T manufactured by The Shin-Etsu Chemical Co., Ltd.) | 8 parts |
| Methyl ethyl ketone/toluene (weight ratio: 1/1) | 400 parts |

Example A5

Synthetic paper (Yupo-FRG-150 having a thickness of 150 μm; manufactured by Oji-Yuka Synthetic Paper Co., Ltd.) was used as a substrate sheet, and a coating solution for a dye-receiving layer and having the following composition was coated by means of a bar coater on one surface of the synthetic paper so that the coverage on a dry basis was 2.5 g/m², and the resultant coating was dried to form a dye-receiving layer. Subsequently, the following coating solution for a release layer and having the following composition was coated on the surface of the dye-receiving layer so that the coverage on a dry basis was 2.0 g/m², and the resultant coating was heat-dried to form a release layer, thereby providing a thermal transfer image-receiving sheet of the present invention.

| Composition of coating solution for dye-receiving layer: | |
| --- | --- |
| Vinyl chloride/vinyl acetate copolymer (#1000A manufactured by Denki Kagaku Kogyo K.K.) | 40 parts |
| Polyester resin (Vylon 600 manufactured by Toyobo Co., Ltd.) | 20 parts |
| Methyl ethyl ketone/toluene (weight ratio: 1/1) | 240 parts |
| Composition of coating solution for release layer: | |
| Vinyl chloride/vinyl acetate copolymer (#1000A manufactured by Denki Kagaku Kogyo K.K.) | 40 parts |
| Release agent No. A | 2 parts |
| Release agent No. a | 4 parts |
| Platinum-based curing catalyst (PL-50T manufactured by The Shin-Etsu Chemical Co., Ltd.) | 3 parts |
| Methyl ethyl ketone/toluene (weight ratio: 1/1) | 160 parts |

Example A6

A thermal transfer image-receiving sheet of the present invention was provided in the same manner as that of Example A5, except that the following coating solutions were used instead of the coating solutions used in Example A5 to form a dye-receiving layer having on its surface a release layer.

| Composition of coating solution for dye-receiving layer: | |
| --- | --- |
| Vinyl chloride/vinyl acetate copolymer (#1000GK manufactured by Denki Kagaku Kogyo K.K.) | 25 parts |
| Polyester resin (Vylon 200 manufactured by Toyobo Co., Ltd.) | 25 parts |
| Methyl ethyl ketone/toluene (weight ratio: 1/1) (Coverage: 2.0 g/m²) | 200 parts |
| Composition of coating solution for release layer: | |
| Vinyl chloride/vinyl acetate copolymer (#1000GK manufactured by Denki Kagaku Kogyo K.K.) | 50 parts |
| Release agent No. C | 2 parts |
| Release agent No. b | 5 parts |
| Platinum-based curing catalyst (PL-50T manufactured by The Shin-Etsu Chemical Co., Ltd.) | 3 parts |
| Methyl ethyl ketone/toluene (weight ratio: 1/1) (Coverage: 2.5 g/m²) | 200 parts |

Example A7

A thermal transfer image-receiving sheet of the present invention was provided in the same manner as that of Example A5, except that the following coating solutions were used instead of the coating solutions used in Example A5 to form a dye-receiving layer having on its surface a release layer.

| Composition of coating solution for dye-receiving layer: | |
| --- | --- |
| Vinyl chloride/vinyl acetate copolymer (#1000A manufactured by Denki Kagaku Kogyo K.K.) | 80 parts |
| Polyester resin (Vylon 600 manufactured by Toyobo Co., Ltd.) | 20 parts |
| Methyl ethyl ketone/toluene (weight ratio: 1/1) (Coverage: 4.5 g/m²) | 400 parts |
| Composition of coating solution for release layer: | |
| Release agent No. A | 2 parts |
| Release agent No. a | 4 parts |
| Platinum-based curing catalyst (PL-50T manufactured by The Shin-Etsu Chemical Co., Ltd.) | 2 parts |
| Methyl ethyl ketone/toluene (weight ratio: 1/1) (Coverage: 5.0 g/m²) | 30 parts |

Example A8

A thermal transfer image-receiving sheet of the present invention was provided in the same manner as that of Example A5, except that the following coating solutions were used instead of the coating solutions used in Example A5 to form a dye-receiving layer having on its surface a release layer.

Composition of coating solution for dye-receiving layer:

| | |
|---|---|
| Vinyl chloride/vinyl acetate copolymer (#1000GK manufactured by Denki Kagaku Koqyo K.K.) | 50 parts |
| Polyester resin (Vylon 600 manufactured by Toyobo Co., Ltd.) | 50 parts |
| Methyl ethyl ketone/toluene (weight ratio: 1/1) (Coverage: 4.5 g/m$^2$) | 400 parts |

Composition of coating solution for release layer:

| | |
|---|---|
| Release agent No. B | 3 parts |
| Release agent No. a | 6 parts |
| Platinum-based curing catalyst (PL-50T manufactured by The Shin-Etsu Chemical Co., Ltd.) | 3 parts |
| Methyl ethyl ketone/toluene (weight ratio: 1/1) (Coverage: 0.5 g/m$^2$) | 50 parts |

Comparative. Example A1

A comparative thermal transfer image-receiving sheet was provided in the same manner as that of Example A1, except that the following coating solution was used instead of the coating solution used in Example A1 to form a dye-receiving layer.

Composition of coating solution:

| | |
|---|---|
| Vinyl chloride/vinyl acetate copolymer (#1000A manufactured by Denki Kagaku Kogyo K.K.) | 80 parts |
| Polyester resin (Vylon 200 manufactured by Toyobo Co., Ltd.) | 20 parts |
| Amino-modified silicone (KS-343 manufactured by The Shin-Etsu Chemical Co., Ltd.) | 5 parts |
| Epoxy-modified silicone (KF-393 manufactured by The Shin-Etsu Chemical co., Ltd.) | 5 parts |
| Platinum-based curing catalyst (PL-50T manufactured by The Shin-Etsu Chemical Co., Ltd.) | 8 parts |
| Methyl ethyl ketone/toluene (weight ratio: 1/1) | 400 parts |

Comparative Example A2

A comparative thermal transfer image-receiving sheet was provided in the same manner as that of Example A5, except that the following coating solutions were used instead of the coating solutions used in Example A5 to form a dye-receiving layer having on its surface a release layer.

Composition of coating solution for dye-receiving layer:

| | |
|---|---|
| Vinyl chloride/vinyl acetate copolymer (#1000A manufactured by Denki Kagaku Kogyo K.K.) | 40 parts |
| Polyester resin (Vylon 600 manufactured by Toyobo Co., Ltd.) | 20 parts |
| Methyl ethyl ketone/toluene (weight ratio: 1/1) (Coverage: 2.5 g/m$^2$) | 250 parts |

Composition of coating solution for release layer:

| | |
|---|---|
| Vinyl chloride/vinyl acetate copolymer (#1000A manufactured by Denki Kagaku Kogyo K.K.) | 40 parts |
| Amino-modified silicone (KS-343 manufactured by The Shin-Etsu Chemical Co., Ltd.) | 5 parts |
| Epoxy-modified silicone (KF-393 manufactured by The Shin-Etsu Chemical Co., Ltd.) | 5 parts |
| Platinum-based curing catalyst (PL-50T manufactured by The Shin-Etsu Chemical Co., Ltd.) | 3 parts |
| Methyl ethyl ketone/toluene (weight ratio: 1/1) (Coverage: 2.0 g/m$^2$) | 150 parts |

Separately, a coating solution for forming a dye layer and having the following composition was prepared and coated by gravure printing on a 6 μm-thick polyethylene terephthalate film having a reverse face subjected to a treatment for rendering the face heat-resistant so that the coverage on a dry basis was 1.0 g/m$^2$, and the resultant coating was dried to provide a thermal transfer sheet used in the present invention.

Composition of coating solution:

| | |
|---|---|
| Kayaset Blue 714 (C.I. Solvent Blue 63 manufactured by Nippon Kayaku Co., Ltd.) | 5.50 parts |
| Polyvinyl butyral resin (Eslec BX-1 manufactured by Sekisui Chemical Co., Ltd.) | 3.00 parts |
| Methyl ethyl ketone/toluene (weight ratio: 1/1) | 22.54 parts |
| Toluene | 68.18 parts |

Thermal Transfer Test

The above-described thermal transfer sheet and the above-described thermal transfer image-receiving sheets of examples of the present invention and comparative examples were put on top of the other in such a manner that the dye layer and the dye-receiving surface faced each other. A cyan image was recorded by means of a thermal head from the back surface of the thermal transfer sheet under conditions of a head applied voltage of 12.0 V, a step pattern in which the applied pulse width was successively reduced from 16.0 msec/line every 1 msec, and a 6 lines/mm (33.3 msec/line) in the sub-scanning direction, and releasability between both the sheets. The results are given in the following table A3.

TABLE A3

| Image-receiving sheet | Curability | Surface property of dye-receiving layer | Coating strength of dye-receiving layer |
|---|---|---|---|
| Ex. A1 | ◯ | ◯ | ◯ |
| Ex. A2 | ◯ | ◯ | ◯ |
| Ex. A3 | ◯ | ◯ | ◯ |
| Ex. A4 | ◯ | ◯ | ◯ |
| Ex. A5 | ◯ | ◯ | ◯ |
| Ex. A6 | ◯ | ◯ | ◯ |
| Ex. A7 | ◯ | ◯ | ◯ |
| Ex. A8 | ◯ | ◯ | ◯ |

TABLE A3-continued

| Image-receiving sheet | Curability | Surface property of dye-receiving layer | Coating strength of dye-receiving layer |
|---|---|---|---|
| Comp. Ex. A1 | X | Δ | X |
| Comp. Ex. A2 | X | O | Δ |

(1) Curability: In preparing the image-receiving sheet, drying was effected at 120° C. in an oven for 3 min, and the dried assembly was cooled at room temperature to observe the set to touch of the surface of the dye-receiving layer. o: Good X: Failure (2) Releasability: The image-receiving sheet and the thermal transfer sheet were put on top of the other, and printing was effect by means of a thermal head. Thereafter, the adhesion between both the sheets was evaluated by peeling the thermal transfer sheet from the image-receiving sheet. The lower the adhesion, the better the releasability. Occurrence of heat fusing makes it difficult to peel the image-receiving sheet and the thermal transfer sheet from each other, which often results in breaking of the substrate. o: Good Δ: Partial failure in peeling X: Failure (3) Scratching resistance of coating: The surface of the image-receiving sheet was rubbed with gauze, and whether or not a scratch was caused by the rubbing was observed with the naked eye. o: Good Δ: Slight scratch observed X: Failure (4) Coating strength of dye-receiving layer: The image-receiving sheet was folded into two with the surface of the dye-receiving layer facing inward, and the fold was observed under a microscope to evaluate the occurrence of cracking. o: Good Δ: Slight cracking observed X: Failure

Examples A9 to A21

Addition-polymerizable silicones and hydrogen-modified silicones represented by the following general formulae were used in Examples A9 to A21, and details thereof are given in the following Tables A4 and A5.

Addition-polymerizable Silicones:

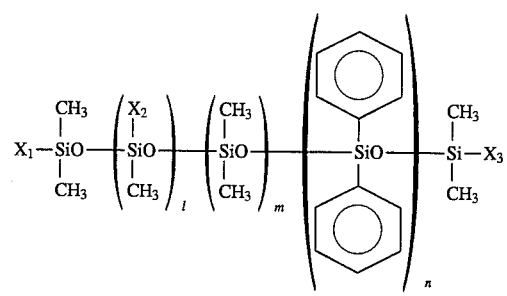

wherein $X_1$, $X_2$ and $X_3$ each independently represent a —CH=CH$_2$ or —CH$_3$ group, provided that at least one of $X_1$, $X_2$ and $X_3$ represents a —CH=CH$_2$ group. In the above addition-polymerizable silicones, individual siloxane units are located at random.

Hydrogen-modified silicones:

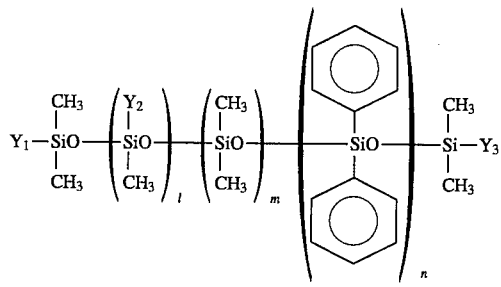

wherein $Y_1$, $Y_2$ and $Y_3$ each independently represent a hydrogen atom or a —CH$_3$ group, provided that at least one of $Y_1$, $Y_2$ and $Y_3$ represents a hydrogen atom. In the above hydrogen-modified silicones, individual siloxane units are located at random.

TABLE A4

| | | (Addition-Polymerizable Silicone) | | | | | |
|---|---|---|---|---|---|---|---|
| No. | Molecular weight | Content of siloxane unit having vinyl group (mol %)* | Content of diphenyl siloxane unit (mol %)* | Content of dimethyl siloxane unit (mol %)* | $x_1$ | $x_2$ | $x_3$ |
| E | 7,000 | 13 | 30 | 57 | —CH=CH$_2$ | —CH=CH$_2$ | —CH$_3$ |
| F | 6,800 | 12 | 5 | 83 | —CH=CH$_2$ | —CH=CH$_2$ | —CH$_3$ |
| G | 7,000 | 13 | 50 | 37 | —CH=CH$_2$ | —CH=CH$_2$ | —CH$_3$ |
| H | 12,000 | 15 | 24 | 61 | —CH=CH$_2$ | —CH=CH$_2$ | —CH$_3$ |
| I | 3,600 | 6 | 30 | 64 | —CH=CH$_2$ | —CH$_3$ | —CH=CH$_2$ |
| J | 6,500 | 13 | 0 | 87 | —CH=CH$_2$ | —CH=CH$_2$ | —CH$_3$ |
| K | 6,900 | 14 | 54 | 32 | —CH=CH$_2$ | —CH=CH$_2$ | —CH$_3$ |
| L | 9,500 | 21 | 10 | 69 | —CH=CH$_2$ | —CH=CH$_2$ | —CH=CH$_2$ |

*: Proportion based on the whole siloxane unit.

TABLE A5

| | | (Hydrogen-Modified Silicone) | | | | | |
|---|---|---|---|---|---|---|---|
| No. | Molecular weight | Content of siloxane unit having hydrogen atom (mol %)* | Content of diphenyl siloxane unit (mol %)* | Content of dimethyl siloxane unit (mol %)* | $Y_1$ | $Y_2$ | $Y_3$ |
| d | 7,000 | 13 | 30 | 57 | H | H | —$CH_3$ |
| e | 3,700 | 8 | 22 | 70 | H | —$CH_3$ | H |
| f | 6,800 | 13 | 50 | 37 | H | H | —$CH_3$ |
| g | 7,300 | 15 | 0 | 85 | H | H | —$CH_3$ |
| h | 6,900 | 12 | 55 | 33 | H | H | —$CH_3$ |
| i | 5,600 | 20 | 26 | 54 | —$CH_3$ | H | —$CH_3$ |

*: Proportion based on the whole siloxane unit.

Example A9

A coating solution having the following composition was coated on Yupo-FRG-150 having a thickness of 150 μm so that the coverage on a dry basis was 5.0 g/m² in the same manner as that of Example A1 to form a dye-receiving layer, thereby providing a thermal transfer image-receiving sheet of the present invention.

| Composition of coating solution for dye-receiving layer: | |
|---|---|
| Polyester resin (Vylon 600 manufactured by Toyobo Co., Ltd.) | 40 parts |
| Vinyl chloride/vinyl acetate copolymer (Denkalac #1000A manufactured by Denki Kagaku Kogyo K.K.) | 40 parts |
| Styrene-acrylic-modified vinyl chloride/vinyl acetate copolymer (Denkalac #400 manufactured by Denki Kagaku Kogyo K.K.) | 20 parts |
| Release agent No. E | 5 parts |
| Release agent No. d | 5 parts |
| Platinum-based curing catalyst (PL-50T manufactured by The Shin-Etsu Chemical Co., Ltd.) | 6 parts |
| Reaction retardant (PLR-5 manufactured by The Shin-Etsu Chemical Co., Ltd.) | 5 parts |
| Methyl ethyl ketone/toluene (weight ratio: 1/1) | Amount to bring solid content to 20 wt. % |

It is noted that the use of a styrene-acrylic-modified vinyl chloride/vinyl acetate copolymer contributes to an improvement in drying property.

Example A10

A thermal transfer image-receiving sheet of the present invention was provided in the same manner as that of Example A9, except that the following coating solution was used instead of the coating solution used in Example A9 to form a dye-receiving layer.

| Composition of coating solution for dye-receiving layer: | |
|---|---|
| Polyester resin (Vylon 600 manufactured by Toyobo Co., Ltd.) | 40 parts |
| Vinyl chloride/vinyl acetate copolymer (Denkalac #1000A manufactured by Denki Kagaku Kogyo K.K.) | 40 parts |
| Styrene-acrylic-modified vinyl chloride/vinyl acetate copolymer (Denkalac #400 manufactured by Denki Kagaku Kogyo K.K.) | 20 parts |
| Release agent No. F | 5 parts |
| Release agent No. g | 5 parts |
| Platinum-based curing catalyst (PL-50T manufactured by The Shin-Etsu Chemical Co., Ltd.) | 6 parts |
| Reaction retardant (PLR-5 manufactured by The Shin-Etsu Chemical Co., Ltd.) | 5 parts |
| Methyl ethyl ketone/toluene (weight ratio: 1/1) | Amount to bring solid content to 20 wt. % |

It is noted that the use of a styrene-acrylic-modified vinyl chloride/vinyl acetate copolymer contributes to an improvement in drying property.

Example A11

A thermal transfer image-receiving sheet of the present invention was provided in the same manner as that of Example A9, except that the following coating solution was used instead of the coating solution used in Example A9 to form a dye-receiving layer.

| Composition of coating solution for dye-receiving layer: | |
|---|---|
| Polyester resin (Vylon 600 manufactured by Toyobo Co., Ltd.) | 40 parts |
| Vinyl chloride/vinyl acetate copolymer (Denkalac #1000A manufactured by Denki Kagaku Kogyo K.K.) | 40 parts |
| Styrene-acrylic-modified vinyl chloride/vinyl acetate copolymer (Denkalac #400 manufactured by Denki Kagaku Kogyo K.K.) | 20 parts |
| Release agent No. G | 5 parts |
| Release agent No. f | 5 parts |
| Platinum-based curing catalyst (PL-50T manufactured by The Shin-Etsu Chemical Co., Ltd.) | 6 parts |
| Reaction retardant (PLR-5 manufactured by The Shin-Etsu Chemical Co., Ltd.) | 5 parts |
| Methyl ethyl ketone/toluene (weight ratio: 1/1) | Amount to bring solid content to 20 wt. % |

It is noted that the use of a styrene-acrylic-modified vinyl chloride/vinyl acetate copolymer contributes to an improvement in drying property.

Example A12

A thermal transfer image-receiving sheet of the present invention was provided in the same manner as that of Example A9, except that the following coating solution was used instead of the coating solution used in Example A9 to form a dye-receiving layer.

| Composition of coating solution for dye-receiving layer: | |
|---|---|
| Polyester resin (Vylon 600 manufactured by Toyobo Co., Ltd.) | 40 parts |
| Vinyl chloride/vinyl acetate copolymer (Denkalac #1000A manufactured by Denki Kagaku Kogyo K.K.) | 60 parts |
| Release agent No. H | 6 parts |
| Release agent No. e | 4 parts |
| Platinum-based curing catalyst (PL-50T manufactured by The Shin-Etsu Chemical Co., Ltd.) | 6 parts |
| Reaction retardant (PLR-5 manufactured by The Shin-Etsu Chemical Co., Ltd.) | 5 parts |
| Methyl ethyl ketone/toluene (weight ratio: 1/1) | Amount to bring solid content to 20 wt. % |

Example A13

A thermal transfer image-receiving sheet of the present invention was provided in the same manner as that of Example A9, except that the following coating solution was used instead of the coating solution used in Example A9 to form a dye-receiving layer.

| Composition of coating solution for dye-receiving layer: | |
|---|---|
| Polyester resin (Vylon 600 manufactured by Toyobo Co., Ltd.) | 40 parts |
| Vinyl chloride/vinyl acetate copolymer (Denkalac #1000A manufactured by Denki Kagaku Kogyo K.K.) | 60 parts |
| Release agent No. I | 5 parts |
| Release agent No. e | 5 parts |
| Platinum-based curing catalyst (PL-50T manufactured by The Shin-Etsu Chemical Co., Ltd.) | 6 parts |
| Reaction retardant (PLR-5 manufactured by The Shin-Etsu Chemical Co., Ltd.) | 5 parts |
| Methyl ethyl ketone/toluene (weight ratio: 1/1) | Amount to bring solid content to 20 wt. % |

Example A14

A thermal transfer image-receiving sheet of the present invention was provided in the same manner as that of Example A9, except that the following coating solution was used instead of the coating solution used in Example A9 to form a dye-receiving layer.

| Composition of coating solution for dye-receiving layer: | |
|---|---|
| Polyester resin (Vylon 600 manufactured by Toyobo Co., Ltd.) | 40 parts |
| Vinyl chloride/vinyl acetate copolymer (Denkalac #1000A manufactured by Denki Kagaku Kogyo K.K.) | 40 parts |
| Styrene-acrylic-modified vinyl chloride/vinyl acetate copolymer (Denkalac #400 manufactured by Denki Kagaku Kogyo K.K.) | 20 parts |
| Release agent No. J | 5 parts |
| Release agent No. g | 5 parts |
| Platinum-based curing catalyst (PL-50T manufactured by The Shin-Etsu Chemical Co., Ltd.) | 6 parts |
| Reaction retardant (PLR-5 manufactured by The Shin-Etsu Chemical Co., Ltd.) | 5 parts |
| Methyl ethyl ketone/toluene (weight ratio: 1/1) | Amount to bring solid content to 20 wt. % |

It is noted that the use of a styrene-acrylic-modified vinyl chloride/vinyl acetate copolymer contributes to an improvement in drying property.

Example A15

A thermal transfer image-receiving sheet of the present invention was provided in the same manner as that of Example A9, except that the following coating solution was used instead of the coating solution used in Example A9 to form a dye-receiving layer.

| Compositon of coating solution for dye-receiving layer: | |
|---|---|
| Polyester resin (Vylon 600 manufactured by Toyobo Co., Ltd.) | 40 parts |
| Vinyl chloride/vinyl acetate copolymer (Denkalac #1000A manufactured by Denki Kagaku Kogyo K.K.) | 40 parts |
| Styrene-acrylic-modified vinyl chloride/vinyl acetate copolymer (Denkalac #400 manufactured by Denki Kagaku Kogyo K.K.) | 20 parts |
| Release agent No. K | 5 parts |
| Release agent No. h | 5 parts |
| Platinum-based curing catalyst (PL-50T manufactured by The Shin-Etsu Chemical Co., Ltd.) | 6 parts |
| Reaction retardant (PLR-5 manufactured by The shin-Etsu Chemical Co., Ltd.) | 5 parts |
| Methyl ethyl ketone/toluene (weight ratio: 1/1) | Amount to bring solid content to 20 wt. % |

It is noted that the use of a styrene-acrylic-modified vinyl chloride/vinyl acetate copolymer contributes to an improvement in drying property.

Example A16

A thermal transfer image-receiving sheet of the present invention was provided in the same manner as that of Example A9, except that the following coating solution was used instead of the coating solution used in Example A9 to form a dye-receiving layer.

| Composition of coating solution for dye-receiving layer: | |
|---|---|
| Polyester resin (Vylon 600 manufactured by Toyobo Co., Ltd.) | 40 parts |
| Vinyl chloride/vinyl acetate copolymer (Denkalac #1000A manufactured by Denki | 40 parts |

| Composition of coating solution for dye-receiving layer: | |
| --- | --- |
| Kagaku Kogyo K.K.) | |
| Styrene-acrylic-modified vinyl chloride/vinyl acetate copolymer (Denkalac #400 manufactured by Denki Kagaku Kogyo K.K.) | 20 parts |
| Release agent No. L | 2.5 parts |
| Release agent No. i | 7.5 parts |
| Platinum-based curing catalyst (PL-50T manufactured by The Shin-Etsu Chemical Co., Ltd.) | 6 parts |
| Reaction retardant (PLR-5 manufactured by The Shin-Etsu Chemical Co., Ltd.) | 5 parts |
| Methyl ethyl ketone/toluene (weight ratio: 1/1) | Amount to bring solid content to 20 wt. % |

It is noted that the use of a styrene-acrylic-modified vinyl chloride/vinyl acetate copolymer contributes to an improvement in drying property.

Example A17

A thermal transfer image-receiving sheet of the present invention was provided in the same manner as that of Example A9, except that the following coating solution was used instead of the coating solution used in Example A9 to form a dye-receiving layer.

| Composition of coating solution for dye-receiving layer: | |
| --- | --- |
| Polyester resin (Vylon 600 manufactured by Toyobo Co., Ltd.) | 40 parts |
| Vinyl chloride/vinyl acetate copolymer (Denkalac #1000A manufactured by Denki Kagaku Kogyo K.K.) | 40 parts |
| Styrene-acrylic-modified vinyl chloride/vinyl acetate copolymper (Denkalac #400 manufactured by Denki Kagaku Kogyo K.K.) | 20 parts |
| Release agent No. J | 5 parts |
| Release agent No. h | 5 parts |
| Platinum-based curing catalyst (PL-50T manufactured by The Shin-Etsu Chemical Co., Ltd.) | 6 parts |
| Reaction retardant (PLR-5 manufactured by The Shin-Etsu Chemical Co., Ltd.) | 5 parts |
| Methyl ethyl ketone/toluene (weight ratio: 1/1) | Amount to bring solid content to 20 wt. % |

It is noted that the use of a styrene-acrylic-modified vinyl chloride/vinyl acetate copolymer contributes to an improvement in drying property.

Example A18

A coating solution for a dye-receiving layer and having the following composition was coated by means of a bar coater on one surface of the same synthetic paper as that used in Example A5 so that the coverage on a dry basis was 5.0 g/m², and the resultant coating was dried to form a dye-receiving layer. Subsequently, the following coating solution for a release layer and having the following composition was coated on the surface of the dye-receiving layer so that the coverage on a dry basis was 0.1 g/m², and the resultant coating was heat-dried to form a release layer, thereby providing a thermal transfer image-receiving sheet of the present invention.

| Composition of coating solution for dye-receiving layer: | |
| --- | --- |
| Polyester resin (Vylon 600 manufactured by Toyobo Co., Ltd.) | 40 parts |
| Vinyl chloride/vinyl acetate copolymer (Denkalac #1000A manufactured by Denki Kagaku Kogyo K.K.) | 40 parts |
| Styrene-acrylic-modified vinyl chloride/vinyl acetate copolymer (Denkalac #400 manufactured by Denki Kagaku Kogyo K.K.) | 20 parts |
| Methyl ethyl ketone/toluene (weight ratio: 1/1) | Amount to bring solid content to 20 wt. % |

(Coverage: 5 g/m²)

| Composition of coating solution for release layer: | |
| --- | --- |
| Polyester resin (Vylon 600 manufactured by Toyobo Co., Ltd.) | 30 parts |
| Release agent No. E | 10 parts |
| Release agent No. i | 10 parts |
| Platinum-based curing catalyst (PL-50T) | 10 parts |
| Ethyl acetate | Amount to bring solid content to 1 wt. % |

(coverage: 0.1 g/m²)

It is noted that the use of a styrene-acrylic-modified vinyl chloride/vinyl acetate copolymer contributes to an improvement in drying property.

Example A19

A thermal transfer image-receiving sheet of the present invention was provided in the same manner as that of Example A18, except that the following coating solutions were used instead of the coating solutions used in Example A18 to form a dye-receiving layer having on its surface a release layer.

| Composition of coating solution for dye-receiving layer: | |
| --- | --- |
| Polyester resin (Vylon 200 manufactured by Toyobo Co., Ltd.) | 20 parts |
| Methyl ethyl ketone/toluene (weight ratio: 1/1) | 80 parts |

(Coverage: 5 g/m²)

| Composition of coating solution for release layer: | |
| --- | --- |
| Polyester resin (Vylon 600 manufactured by Toyobo Co., Ltd.) | 30 parts |
| Release agent No. E | 10 parts |
| Release agent No. d | 10 parts |
| Platinum-based curing catalyst (PL-50T) | 10 parts |
| Ethyl acetate | Amount to bring solid content to 1 wt. % |

(Coverage: 0.1 g/m²)

Example A20

A thermal transfer image-receiving sheet of the present invention was provided in the same manner as that of Example A18, except that the following coating solutions were used instead of the coating solutions used in Example A18 to form a dye-receiving layer having on its surface a release layer.

| Composition of coating solution for dye-receiving layer: | |
|---|---|
| Water dispersion of polyester resin (Vylonal MD-1200 manufactured by Toyobo Co., Ltd.) | 50 parts |
| IPA/water (1/1) | 50 parts |
| (Coverage: 5.0 g/m$^2$) | |
| Composition of coating solution for release layer: | |
| As described in Example A19 | |

Example A21

A thermal transfer image-receiving sheet of the present invention was provided in the same manner as that of Example A18, except that the following coating solutions were used instead of the coating solutions used in Example A18 to form a dye-receiving layer having on its surface a release layer.

| Composition of coating solution for dye-receiving layer: | |
|---|---|
| Polyester resin (Vylon 600 manufactured by Toyobo Co., Ltd.) | 40 parts |
| Vinyl chloride/vinyl acetate copolymer (#1000A manufactured by Denki Kagaku Kogyo K.K.) | 40 parts |
| Styrene-acrylic-modified vinyl chloride/vinyl acetate copolymer (#400 manufactured by Denki Kagaku Kogyo K.K.) | 20 parts |
| Methyl ethyl ketone/toluene (weight ratio: 1/1) | Amount to bring solid content to 20 wt. % |
| (Coverage: 5.0 g/m$^2$) | |
| Composition of coating solution for release layer: | |
| Release agent No. E | 10 parts |
| Release agent No. i | 10 parts |
| Platinum-based curing catalyst (PL-50T) | 10 parts |
| Ethyl acetate | Amount to bring solid content to 1 wt. % |
| (Coverage: 0.1 g/m$^2$) | |

It is noted that the use of a styrene-acrylic-modified vinyl chloride/vinyl acetate copolymer contributes to an improvement in drying property.

Thermal Transfer Test

Thermal transfer recording was effected under the following printing conditions to form a cyan image, and the releasability between the thermal transfer sheet and the image-receiving sheet and the like were examined. The results are given in the following Table 6. In this test, the thermal transfer sheet used was the same as that used in the above-described test.

Specifications of thermal head:

Model: L-335 manufactured by TDK

Heating element density: 6 dots/mm

Average of resistance of heating element: 571 Ω

Printing conditions:

Printing speed: 5.5 msec/line

Applied voltage: 15.7 V

Applied pulse width: 16 step pattern wherein the pulse width is successively reduced from 4.4 msec/line every 0.275 msec.

Releasability:

⊚: Good record provided with substantially no need of any force for peeling the thermal transfer sheet from the image-receiving sheet and without occurrence of any problem attributable to heat fusing of the image-receiving sheet and the thermal transfer sheet to each other.

○: Good record provided without occurrence of any problem attributable to heat fusing of the image-receiving sheet and the thermal transfer sheet to each other although some force is needed for peeling the thermal transfer sheet from the image-receiving sheet.

Δ: Partial failure in peeling due to heat fusing

X: Failure

Scratch resistance: The surface of the image-receiving sheet was rubbed with gauze by reciprocating the gauze 5 times, and printing was effected under the above-described conditions to evaluate the releasability.

○: Good releasability obtained without difference in releasability between the rubbed portion and the unrubbed portion Δ: Heat fusing of some dye binder to the rubbed portion observed X: Complete heat fusing of the rubbed portion observed The other evaluation items were the same as those of Examples A1 and A2.

TABLE A6

| Ex. No. | Curability | Releasability | Scratching resistance | Coating strength of dye-receiving layer | Overall evaluation |
|---|---|---|---|---|---|
| Ex. A9  | ○ | ⊚ | ○ | ○ | ⊚ |
| Ex. A10 | ○ | ⊚ | ○ | ○ | ⊚ |
| Ex. A11 | ○ | ⊚ | ○ | ○ | ⊚ |
| Ex. A12 | ○ | ⊚ | ○ | ○ | ⊚ |
| Ex. A13 | ○ | ⊚ | ○ | ○ | ⊚ |
| Ex. A14 | ○ | ⊚ | Δ | Δ | ○ |
| Ex. A15 | ○ | ○ | ○ | ○ | ⊚ |
| Ex. A16 | ○ | ⊚ | ○ | ○ | ⊚ |
| Ex. A17 | ○ | ⊚ | Δ | ○ | ○ |
| Ex. A18 | ○ | ⊚ | ○ | ○ | ⊚ |
| Ex. A19 | ○ | ⊚ | ○ | ○ | ⊚ |
| Ex. A20 | ○ | ⊚ | ○ | ○ | ⊚ |
| Ex. A21 | ○ | ⊚ | Δ | Δ | ○ |

Thus, according to the present invention, the use of a mixture of particular reactive silicones as a release agent can provide a thermal transfer image-receiving sheet having a dye-receiving layer which is excellent in reaction rate of the release agent, coating strength of the release layer and releasability from a thermal transfer sheet.

| Reference Example B1 | |
| --- | --- |
| Release agent No. E | 5 parts |
| Release agent No. d | 5 parts |
| Platinum-based curing catalyst (PL-50T manufactured by The Shin-Etsu Chemical Co., Ltd.) | 0 or 6 parts |
| Reaction retardant (silylation product of acetylenic alcohol; PLR-5 manufactured by The Shin-Etsu Chemical Co., Ltd.) | 0 or 2 parts |
| Methyl ethyl ketone/toluene (weight ratio: 1/1) | Amount to bring solid content to 20 wt. % |

The relationship between the reaction temperature and the reaction rate (under conditions as described in Example B1) was examined using the above composition with respect to three composition samples, i.e., a composition sample wherein use was made of the silicone, a composition sample wherein use was made of the silicone in combination with the reaction retardant and a composition sample wherein use was made of the silicone in combination with the reaction retardant and the catalyst. The results are shown in FIG. 1.

Example B1

Synthetic paper (Yupo-FRG-150 having a thickness of 150 μm; manufactured by Oji-Yuka Synthetic Paper Co., Ltd.) was used as a substrate sheet, and a coating solution having the following composition was coated by means of a bar coater on one surface of the synthetic paper so that the coverage on a dry basis was 5.0 g/m², and the resultant coating was dried with a drier and then heat-treated in an oven at about 130° C. for 30 sec to form a dye-receiving layer, thereby providing a thermal transfer image-receiving sheet of the present invention.

| Composition of coating solution: | |
| --- | --- |
| Vinyl chloride/vinyl acetate copolymer (#1000A manufactured by Denki Kagaku Kogyo K.K.) | 80 parts |
| Polyester resin (Vylon 600 manufactured by Toyobo Co., Ltd.) | 20 parts |
| Release agent No. E | 5 parts |
| Release agent No. d | 5 parts |
| Platinum-based curing catalyst (PL-50T manufactured by The Shin-Etsu Chemical Co., Ltd.) | 10 parts |
| Reaction retardant (silylation product of acetylenic alcohol; PLR-5 manufactured by The Shin-Etsu Chemical Co., Ltd.) | 0 to 10 parts |
| Methyl ethyl ketone/toluene (weight ratio: 1/1) | Amount to bring solid content to 20 wt. % |

The resultant thermal transfer image-receiving sheets were allowed to stand immediately after the completion of the production for a period of time specified in the following Table B1, inserted into a test printer (VY-P1 manufactured by Hitachi, Ltd.) and allowed to stand at 40° C. for 3 hr. Then, 20 sheets of high-density solid printing were continuously effected at that temperature to determine the releasability between the thermal transfer sheet and the image-receiving sheet. The results are given in the following Table B1.

TABLE B1

| Standing time (hr) | Amount of reaction retardant | | |
| --- | --- | --- | --- |
| | 0 part | 2 parts | 10 parts |
| 0 | O | O | O |
| 4 | O | O | O |
| 8 | X | O | O |
| 24 | X | O | O |
| 100 | X | X | O |

Note:
O — good releasability
X — poor releasability

Example B2

Synthetic paper (Yupo-FRG-150 having a thickness of 150 μm; manufactured by Oji-Yuka Synthetic Paper Co., Ltd.) was used as a substrate sheet, and a coating solution for a dye-receiving layer and having the following composition was coated by means of a bar coater on one surface of the synthetic paper so that the coverage on a dry basis was 2.5 g/m², and the resultant coating was dried to form a dye-receiving layer. Subsequently, the following coating solution for a release layer and having the following composition was coated on the surface of the dye-receiving layer so that the coverage on a dry basis was 2.0 g/m², and the resultant coating was heat-dried to form a release layer, thereby providing a thermal transfer image-receiving sheet of the present invention.

| Composition of coating solution for dye-receiving layer: | |
| --- | --- |
| Vinyl chloride/vinyl acetate copolymer (#1000A manufactured by Denki Kagaku Kogyo K.K.) | 40 parts |
| Polyester resin (Vylon 600 manufactured by Toyobo Co., Ltd.) | 20 parts |
| Methyl ethyl ketone/toluene (weight ratio: 1/1) | Amount to bring solid content to 20 wt. % |
| Composition of coating solution for release layer: | |
| Vinyl chloride/vinyl acetate copolymer (#1000A manufactured by Denki Kagaku Kogyo K.K.) | 40 parts |
| Release agent No. E | 5 parts |
| Release agent No. d | 5 parts |
| Platinum-based curing catalyst (PL-50T manufactured by The Shin-Etsu Chemical Co., Ltd.) | 10 parts |
| Reaction retardant (silylation product of acetylenic alcohol; PLR-5 manufactured by The Shin-Etsu Chemical Co., Ltd.) | 0 to 10 parts |
| Methyl ethyl ketone/toluene (weight ratio: 1/1) | Amount to bring solid content to 20 wt. % |

The resultant alcohols were evaluated in the same manner as that of Example B1. The results are given in the following Table B2.

TABLE B2

| Standing | Amount of reaction retardant | | |
|---|---|---|---|
| time (hr) | 0 part | 2 parts | 10 parts |
| 0 | O | O | O |
| 4 | O | O | O |
| 8 | X | O | O |
| 24 | X | O | O |
| 100 | X | X | O |

Note:
O — good releasability
X — poor releasability

Example B3

A thermal transfer image-receiving sheet of the present invention was provided in the same manner as that of Example B2, except that the following coating solutions were used instead of the coating solutions used in Example B2 to form a dye-receiving layer having on its surface a release layer.

| Composition of coating solution for dye-receiving layer: | |
|---|---|
| Vinyl chloride/vinyl acetate copolymer (#1000GK manufactured by Denki Kagaku Kogyo K.K.) | 25 parts |
| Polyester resin (Vylon 200 manufactured by Toyobo Co., Ltd.) | 25 parts |
| Methyl ethyl ketone/toluene (weight ratio: 1/1) (Coverage: 2.0 g/m²) | Amount to bring solid content to 20 wt. % |
| Composition of coating solution for release layer: | |
| Vinyl chloride/vinyl acetate copolymer (#1000GK manufactured by Denki Kagaku Kogyo K.K.) | 50 parts |
| Amino-modified silicone (KS-343 manufactured by The Shin-Etsu Chemical Co., Ltd.) | 5 parts |
| Epoxy-modified silicone (KF-393 manufactured by The Shin-Etsu Chemical Co., Ltd.) | 5 parts |
| Platinum-based curing catalyst (PL-50T manufactured by The Shin-Etsu Chemical Co., Ltd.) | 3 parts |
| Reaction retardant (silylation product of acetylenic alcohol; PLR-5 manufactured by The Shin-Etsu Chemical Co., Ltd.) | 0 to 10 parts |
| Methyl ethyl ketone/toluene (weight ratio: 1/1) (Coverage: 2.5 g/m²) | Amount to bring solid content to 20 wt. % |

The resultant alcohols were evaluated in the same manner as that of Example B1. The results are given in the following Table B3.

TABLE B3

| Standing | Amount of reaction retardant | | |
|---|---|---|---|
| time (hr) | 0 part | 2 parts | 10 parts |
| 0 | O | O | O |
| 4 | O | O | O |
| 8 | X | O | O |
| 24 | X | O | O |
| 100 | X | X | O |

Note:
O — good releasability
X — poor releasability

Thus, according to the present invention, when a dye-receiving layer or a release layer is formed, the use of a coating solution comprising a liquid medium and, incorporated therein as indispensable components, a reactive silicone, a reaction catalyst and a reaction retardant enables the reaction of the release agent to be sufficiently retarded when the release agent is in a coating solution form, while after the formation of the dye-receiving layer or release layer, there occurs a rapid increase in the reaction rate, so that not only the image-receiving sheet can be produced with a high efficiency but also it becomes possible to provide a thermal transfer image-receiving sheet having a dye-receiving layer which is excellent in coating strength of the release layer and releasability from a thermal transfer sheet.

Example C1

Synthetic paper (Yupo-FRG-150 having a thickness of 150 μm; manufactured by Oji-Yuka Synthetic Paper Co., Ltd.) was used as a substrate sheet, and a coating solution for a dye-receiving layer and having the following composition was coated by means of a bar coater on one surface of the synthetic paper so that the coverage on a dry basis was 5.0 g/m², and the resultant coating was dried with a drier and then heat-treated in an oven at about 130° C. for 30 sec to form a dye-receiving layer. Subsequently, a 20% solution of a platinum-based catalyst PL-50T (manufactured by The Shin-Etsu Chemical Co., Ltd.) in a methyl ethyl ketone/toluene (1:1) mixed solvent was coated on the surface of the above-described dye-receiving layer so that the coverage on a dry basis was 50% by weight based on the amount of the catalyst-curing silicone added to the dye-receiving layer, and the resultant coating was dried with a drier and then heat-treated in an oven at about 130° C. for 30 sec to provide a thermal transfer image-receiving sheet of the present invention.

| Composition of coating solution for dye-receiving layer: | |
|---|---|
| Vinyl chloride/vinyl acetate copolymer (#1000A manufactured by Denki Kagaku Kogyo K.K.) | 80 parts |
| Polyester resin (Vylon 600 manufactured by Toyobo Co., Ltd.) | 20 parts |
| Release agent No. E | 5 parts |
| Release agent No. d | 5 parts |
| Epoxy-modified silicone (X-22-3000T manufactured by The Shin-Etsu Chemical Co., Ltd.) | 5 parts |
| Methyl ethyl ketone/toluene (weight ratio: 1/1) | Amount to bring solid content to 20 wt. % |

Example C2

A coating solution for a dye-receiving layer and having the following composition was coated by means of a bar coater on one surface of the same substrate sheet as that used in Example C1 so that the coverage on a dry basis was 2.5 g/m², and the resultant coating was dried with a drier and then heat-treated in an oven at about 130° C. for 30 sec to form a dye-receiving layer. Subsequently, a coating solution for a release layer and having the following composition was coated at a coverage on a dry basis of 2.5 g/m² on the surface of the dye-receiving layer and dried in the same manner as that described above. Then, a 20% solution of a platinum-based catalyst PL-50T (manufactured by The Shin-Etsu Chemical Co., Ltd.) in a methyl ethyl ketone/toluene (1:1) mixed solvent was coated thereon so that the coverage on a dry basis was 50% by weight based on the amount of the catalyst-curing silicone added to the release layer, and the resultant coating was dried with a drier and then heat-treated in an oven at about 130° C. for 30 sec to provide a thermal transfer image-receiving sheet of the present invention.

| Composition of coating solution for dye-receiving layer: | |
| --- | --- |
| Vinyl chloride/vinyl acetate copolymer (#1000A manufactured by Denki Kagaku Kogyo K.K.) | 40 parts |
| Polyester resin (Vylon 600 manufactured by Toyobo Co., Ltd.) | 20 parts |
| Methyl ethyl ketone/toluene (weight ratio: 1/1) | Amount to bring solid content to 20 wt. % |
| Composition of coating solution for release layer: | |
| Vinyl chloride/vinyl acetate copolymer (#1000A manufactured by Denki Kagaku Kogyo K.K.) | 40 parts |
| Release agent No. E | 5 parts |
| Release agent No. d | 5 parts |
| Epoxy-modified silicone (X-22-3000T manufactured by The Shin-Etsu Chemical Co., Ltd.) | 5 parts |
| Methyl ethyl ketone/toluene (weight ratio: 1/1) | Amount to bring solid content to 20 wt. % |

Example C3

A coating solution for a dye-receiving layer and having the following composition was coated by means of a bar coater on one surface of the same substrate sheet as that used in Example C1 so that the coverage on a dry basis was 4.5 g/m², and the resultant coating was dried with a drier and then heat-treated in an oven at about 130° C. for 30 sec to form a dye-receiving layer. Subsequently, a coating solution for a release layer and having the following composition was coated at a coverage on a dry basis of 0.5 g/m² on the surface of the dye-receiving layer and dried in the same manner as that described above. Then, a 20% solution of a platinum-based catalyst PL-50T (manufactured by The Shin-Etsu Chemical Co., Ltd.) in a methyl ethyl ketone/toluene (1:1) mixed solvent was coated thereon so that the coverage on a dry basis was 50% by weight based on the amount of the catalyst-curing silicone added to the release layer, and the resultant coating was dried with a drier and then heat-treated in an oven at about 130° C. for 30 sec to provide a thermal transfer image-receiving sheet of the present invention.

| Composition of coating solution for dye-receiving layer: | |
| --- | --- |
| Vinyl chloride/vinyl acetate copolymer (#1000A manufactured by Denki Kagaku Kogyo K.K.) | 65 parts |
| Polyester resin (Vylon 600 manufactured by Toyobo Co., Ltd.) | 35 parts |
| Methyl ethyl ketone/toluene (weight ratio: 1/1) | Amount to bring solid content to 20 wt. % |
| Composition of coating solution for release layer: | |
| Release agent No. E | 5 parts |
| Release agent No. d | 5 parts |
| Epoxy-modified silicone (X-22-3000T manufactured by The Shin-Etsu Chemical Co., Ltd.) | 5 parts |
| Methyl ethyl ketone/toluene (weight ratio: 1/1) | Amount to bring solid content to 20 wt. % |

Example C4

A coating solution for a dye-receiving layer and having the following composition was coated by means of a bar coater on one surface of the same substrate sheet as that used in Example C1 so that the coverage on a dry basis was 4.5 g/m², and the resultant coating was dried with a drier and then heat-treated in an oven at about 130° C. for 30 sec to form a dye-receiving layer. Subsequently, a coating solution for a release layer and having the following composition was coated at a coverage on a dry basis of 0.5 g/m² on the surface of the dye-receiving layer, and the resultant coating was heat-treated in an oven at about 130° C. for 30 sec to form a release layer (thickness: 0.5 g/m²), thereby providing a thermal transfer image-receiving sheet of the present invention.

| Composition of coating solution for dye-receiving layer: | |
| --- | --- |
| Vinyl chloride/vinyl acetate copolymer (#1000A manufactured by Denki Kagaku Kogyo K.K.) | 80 parts |
| Polyester resin (Vylon 600 manufactured by Toyobo Co., Ltd.) | 20 parts |
| Platinum-based curing catalyst (PL-50T manufactured by The Shin-Etsu Chemical Co., Ltd.) | 5 parts |
| Methyl ethyl ketone/toluene (weight ratio: 1/1) | Amount to bring solid content to 20 wt. % |
| Composition of coating solution for release layer: | |
| Release agent No. E | 5 parts |
| Release agent No. d | 5 parts |
| Epoxy-modified silicone (X-22-3000T manufactured by The Shin-Etsu Chemical Co., Ltd.) | 5 parts |

Example C5

A thermal transfer image-receiving sheet was provided in the same manner as that of Example C4, except that a coating solution for a dye-receiving layer and having the following composition and a coating solution for a release layer and having the following composition were used at the following respective coverages instead of those used in Example C4.

| Composition of coating solution for dye-receiving layer: | |
| --- | --- |
| Polyester resin (Vylon 600 manufactured by Toyobo Co., Ltd.) | 40 parts |
| Vinyl chloride/vinyl acetate copolymer (#1000A manufactured by Denki Kagaku Kogyo K.K.) | 40 parts |
| Styrene-acrylic-modified vinyl | 20 parts |

| | |
|---|---|
| chloride/vinyl acetate copolymer (#400 manufactured by Denki Kagaku Kogyo K.K.) | |
| Release agent No. E | 2 parts |
| Release agent No. d | 2 parts |
| Methyl ethyl ketone/toluene (weight ratio: 1/1) | Amount to bring solid content to 20 wt. % |
| (Coverage: 5 g/m²) | |

Composition of coating solution for release layer:

| | |
|---|---|
| Polyester resin (Vylon 600 manufactured by Toyobo Co., Ltd.) | 10 parts |
| Platinum-based curing catalyst (PL-50T manufactured by The Shin-Etsu Chemical Co., Ltd.) | 10 parts |
| Ethyl acetate | Amount to bring solid content to 1 wt. % |
| (Coverage: 0.1 g/m²) | |

It is noted that the use of a styrene-acrylic-modified vinyl chloride/vinyl acetate copolymer contributes to an improvement in drying property.

Example C6

A thermal transfer image-receiving sheet was provided in the same manner as that of Example C4, except that a coating solution for a dye-receiving layer and having the following composition and a coating solution for a release layer and having the following composition were used at the following respective coverages instead of those used in Example C4.

Composition of coating solution for dye-receiving layer:

| | |
|---|---|
| Water dispersion of polyester resin (Vylonal MD-1200 manufactured by Toyobo Co., Ltd.) | 50 parts |
| Emulsion of release agent No. E | 2 parts |
| Emulsion of release agent No. d | 2 parts |
| IPA/water (1/1) | 50 parts |
| (Coverage: 5 g/m²) | |

Composition of coating solution for release layer:
As described in Example C5

Comparative Example C1

A coating solution for a dye-receiving layer and having the following composition was coated by means of a bar coater on one surface of the same substrate sheet as that used in Example C1 so that the coverage on a dry basis was 5.0 g/m², and the resultant coating was dried with a drier and then heat-treated in an oven at about 130° C. for 30 sec to form a dye-receiving layer, thereby providing a comparative image-receiving sheet.

Composition of coating solution for dye-receiving layer:

| | |
|---|---|
| Vinyl chloride/vinyl acetate copolymer (#1000A manufactured by Denki Kagaku Kogyo K.K.) | 80 parts |
| Polyester resin (Vylon 600 manufactured by Toyobo Co., Ltd.) | 20 parts |
| Release agent No. E | 5 parts |
| Release agent No. d | 5 parts |
| Epoxy-modified silicone (X-22-3000T manufactured by The Shin-Etsu Chemical Co., Ltd.) | 5 parts |

Composition of coating solution for dye-receiving layer:

| | |
|---|---|
| Methyl ethyl ketone/toluene (weight ratio: 1/1) | Amount to bring solid content to 20 wt. % |

Evaluation Example

In the preparation of the above-described thermal transfer image-receiving sheets, the coating solutions for respective examples were allowed to stand for a given period of time and then used to prepare thermal transfer image-receiving sheets that were then subjected to evaluation of releasability as follows. The image-receiving sheets were inserted into a test printer (VY-P1 manufactured by Hitachi, Ltd.) and allowed to stand at 40° C. for 3 hr. Then, 20 sheets of high-density solid printing were continuously effected to determine the releasability between the thermal transfer sheet and the image-receiving sheet. The results are given in the following Table C1.

TABLE C1

| Standing time (hr) | Ex. C1 | Ex. C2 | Ex. C3 | Ex. C4 | Ex. C5 | Ex. C6 | Comp. Ex. C1 |
|---|---|---|---|---|---|---|---|
| 0 | O | O | O | O | O | O | O |
| 4 | O | O | O | O | O | O | Δ |
| 8 | O | O | O | O | O | O | X |
| 24 | O | O | O | O | O | Δ | X |

Note:
O: Good
Δ: Slightly poor
X: Failure

As is apparent from the above Table C1, according to the present invention, the coating solutions used have a good stability, which eliminates the need of using the coating solution immediate after the preparation of the coating solutions, so that it becomes possible to continuously produce a thermal transfer image-receiving sheet for a long period of time, Thus, according to the present invention, in the formation of a release layer comprising a catalyst-curing release agent and a curing agent on the surface of a dye-receiving layer, when the release agent and the curing catalyst are used separately from each other, it becomes possible to produce a thermal transfer image-receiving sheet having a dye-receiving layer which is excellent in coating strength of the release layer and releasability of the thermal transfer image-receiving sheet from a thermal transfer sheet.

We claim:

1. A process for producing a thermal transfer image-receiving sheet, comprising the step of coating a coating solution containing a dye-receiving resin on at least one surface of a substrate sheet to form a dye-receiving layer, wherein said coating solution contains a release agent mixture comprising an addition-polymerizable silicone and a hydrogen-modified silicone.

2. A process for producing a thermal transfer image-receiving sheet according to claim 1, wherein said coating solution containing a release agent contains a resin binder.

3. A process for producing a thermal transfer image-receiving sheet according to claim 2, wherein said coating solution further contains a curing catalyst.

4. A process for producing a thermal transfer image-receiving sheet according to claim 1, wherein said coating solution further contains a curing catalyst.

5. A process for producing a thermal transfer image-receiving sheet, comprising the steps of: forming a dye-receiving layer on at least one surface of a substrate sheet and then coating a coating solution containing a release agent on said dye-receiving layer to form a release layer, wherein said release agent comprises a mixture of an addition-polymerizable silicone with a hydrogen-modified silicone.

6. A process for producing a thermal transfer image-receiving sheet according to claim 5, wherein said coating solution containing a release agent contains a resin binder.

7. A process for producing a thermal transfer image-receiving sheet according to claim 5, wherein said coating solution further contains a curing catalyst.

* * * * *